(12) United States Patent
Hara et al.

(10) Patent No.: US 7,801,563 B2
(45) Date of Patent: Sep. 21, 2010

(54) RADIO BASE STATION APPARATUS AND RADIO COMMUNICATION METHOD

(75) Inventors: Masayuki Hara, Kawasaki (JP); Atsushi Shinozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1182 days.

(21) Appl. No.: 10/944,497

(22) Filed: Sep. 17, 2004

(65) Prior Publication Data

US 2005/0266799 A1 Dec. 1, 2005

(30) Foreign Application Priority Data

May 26, 2004 (JP) .............................. 2004-156707

(51) Int. Cl.
*H04M 1/00* (2006.01)
(52) U.S. Cl. .............. 455/562.1; 455/452.1; 455/550.1; 455/552; 370/331; 370/337
(58) Field of Classification Search ................. 455/561, 455/550.1, 25, 63.4, 562.1, 436, 450, 452.1, 455/452.2, 552.1, 560; 370/328, 329, 331, 370/336, 337
See application file for complete search history.

(56) References Cited

U.S. PATENT DOCUMENTS

| | | | | |
|---|---|---|---|---|
| 2,535,048 A | * | 12/1950 | Adams et al. .................. 342/52 |
| 5,818,385 A | * | 10/1998 | Bartholomew ............... 342/372 |
| 5,995,497 A | * | 11/1999 | Gerakoulis ................... 370/320 |
| 6,038,459 A | * | 3/2000 | Searle et al. .............. 455/562.1 |
| 6,064,338 A | * | 5/2000 | Kobayakawa et al. ........ 342/378 |
| 6,101,399 A | * | 8/2000 | Raleigh et al. ............... 455/561 |
| 6,347,220 B1 | * | 2/2002 | Tanaka et al. ............. 455/277.2 |
| 6,385,181 B1 | * | 5/2002 | Tsutsui et al. ................ 370/335 |
| 6,433,738 B1 | * | 8/2002 | Kikuchi ....................... 342/368 |
| 6,453,177 B1 | * | 9/2002 | Wong et al. ............... 455/562.1 |
| 6,549,527 B1 | * | 4/2003 | Tsutsui et al. ................ 370/342 |
| 6,556,845 B1 | * | 4/2003 | Ide et al. ................... 455/562.1 |
| 6,577,273 B2 | * | 6/2003 | Hamada et al. .............. 342/442 |
| 6,754,467 B1 | * | 6/2004 | Ide et al. ........................ 455/25 |
| 6,754,475 B1 | * | 6/2004 | Harrison et al. .......... 455/115.1 |
| 6,845,244 B2 | * | 1/2005 | Ide et al. ...................... 455/506 |
| 6,862,462 B2 | * | 3/2005 | Hirabe ...................... 455/562.1 |
| 6,864,839 B2 | * | 3/2005 | Hamada et al. .............. 342/442 |

(Continued)

FOREIGN PATENT DOCUMENTS

JP 2000-209017 7/2000

(Continued)

OTHER PUBLICATIONS

Notice of Rejection Ground dated Mar. 10, 2009, from the corresponding, Japanese Application.

*Primary Examiner*—Nhan Le
(74) *Attorney, Agent, or Firm*—Katten Muchin Rosenman LLP

(57) ABSTRACT

The radio base station apparatus comprises: a plurality of antenna elements for transmitting and receiving radio signals; a detection unit for detecting information about an uplink dedicated channel corresponding to a first user equipment from signals received via the plurality of antenna elements; a directivity control unit for determining directivity of transmission power based on the information detected by the detection unit when signals are transmitted to the first user equipment via the downlink shared channel; and a transmission unit for transmitting signals with the directivity determined by the directivity control unit.

13 Claims, 21 Drawing Sheets

U.S. PATENT DOCUMENTS

| | | | | |
|---|---|---|---|---|
| 6,879,845 | B2* | 4/2005 | Suzuki et al. | 455/562.1 |
| 6,928,296 | B2* | 8/2005 | Kanemoto et al. | 455/522 |
| 6,982,968 | B1* | 1/2006 | Barratt et al. | 370/328 |
| 7,026,991 | B2* | 4/2006 | Hamada et al. | 342/442 |
| 7,035,672 | B2* | 4/2006 | Nakaya et al. | 455/562.1 |
| 7,079,809 | B1* | 7/2006 | Scherzer | 455/39 |
| 7,102,582 | B2* | 9/2006 | Sato | 343/767 |
| 7,123,943 | B2* | 10/2006 | Ylitalo | 455/562.1 |
| 7,171,241 | B2* | 1/2007 | Ylitalo | 455/562.1 |
| 7,203,519 | B2* | 4/2007 | Ylitalo | 455/562.1 |
| 7,363,057 | B2* | 4/2008 | Ishii et al. | 455/562.1 |
| 7,373,177 | B2* | 5/2008 | Ylitalo | 455/562.1 |
| 7,412,212 | B2* | 8/2008 | Hottinen | 455/101 |
| 7,657,275 | B2* | 2/2010 | Kasturi et al. | 455/522 |
| 2001/0020917 | A1* | 9/2001 | Hamada et al. | 342/442 |
| 2002/0070892 | A1* | 6/2002 | Kikuchi | 342/368 |
| 2003/0021353 | A1* | 1/2003 | Hiramatsu et al. | 375/267 |
| 2003/0223591 | A1* | 12/2003 | Murase et al. | 381/92 |
| 2004/0214602 | A1* | 10/2004 | Aoyama | 455/561 |
| 2004/0235529 | A1* | 11/2004 | Tarokh et al. | 455/562.1 |
| 2005/0037718 | A1* | 2/2005 | Kim et al. | 455/101 |
| 2005/0124347 | A1* | 6/2005 | Hosein | 455/446 |
| 2005/0148369 | A1* | 7/2005 | Hiramatsu et al. | 455/561 |
| 2005/0181832 | A1* | 8/2005 | Ishii et al. | 455/562.1 |
| 2005/0239419 | A1* | 10/2005 | Fudaba et al. | 455/101 |
| 2006/0003710 | A1* | 1/2006 | Nakagawa et al. | 455/101 |
| 2006/0211439 | A1* | 9/2006 | Mizuguchi | 455/522 |
| 2006/0234789 | A1* | 10/2006 | Tarokh et al. | 455/575.7 |
| 2006/0273959 | A1* | 12/2006 | Kawasaki | 342/368 |
| 2006/0292994 | A1* | 12/2006 | Oura et al. | 455/67.16 |
| 2007/0009016 | A1* | 1/2007 | Tsutsui | 375/219 |
| 2007/0182619 | A1* | 8/2007 | Honda et al. | 342/80 |

FOREIGN PATENT DOCUMENTS

| | | |
|---|---|---|
| JP | 2000-278327 | 10/2000 |
| JP | 2001-339758 | 12/2001 |
| JP | 2002-261670 | 9/2002 |
| JP | 2002-325063 | 11/2002 |
| JP | 2002-368662 | 12/2002 |
| JP | 2003-298498 | 10/2003 |
| JP | 2003-318861 | 11/2003 |
| JP | 2004-7716 | 1/2004 |

* cited by examiner

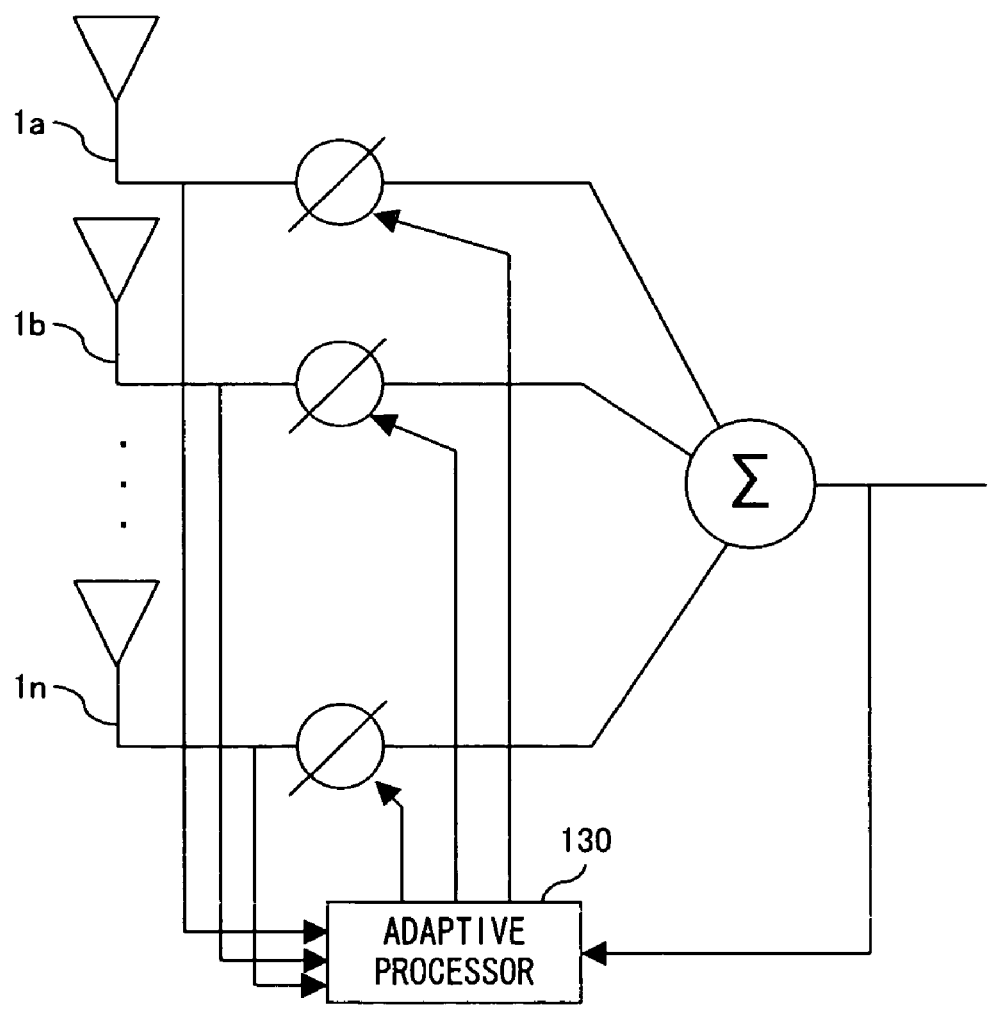
F I G. 3

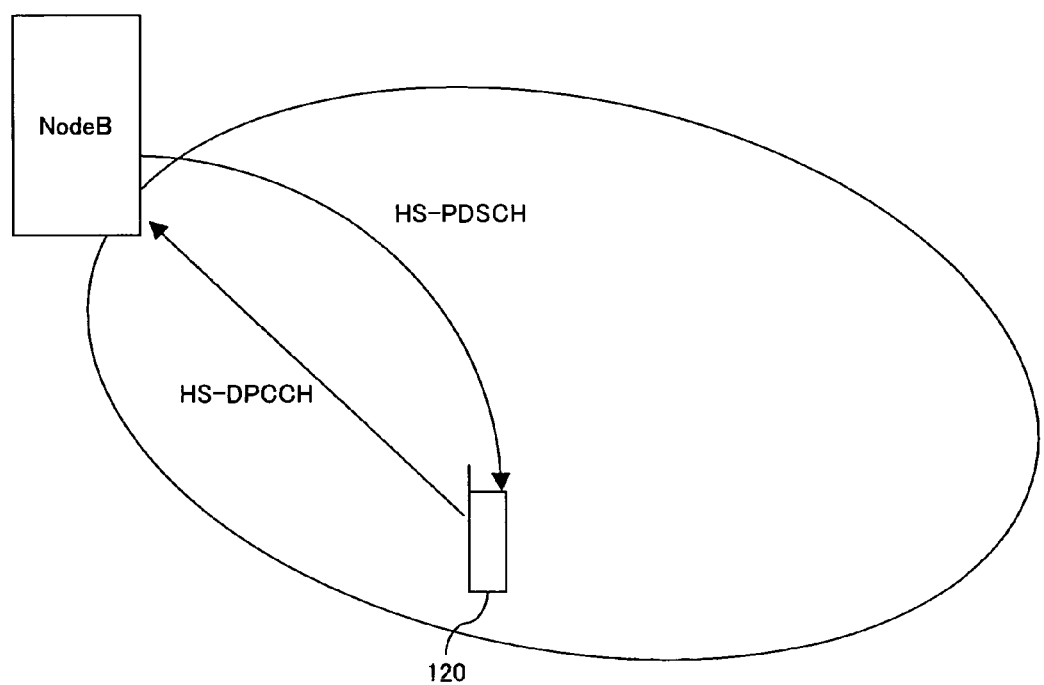
F I G. 4

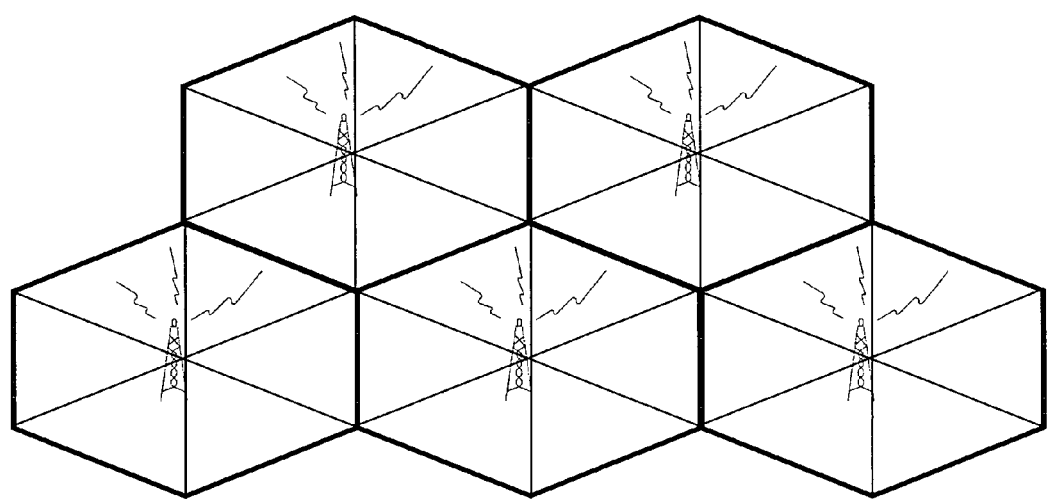
F I G. 5

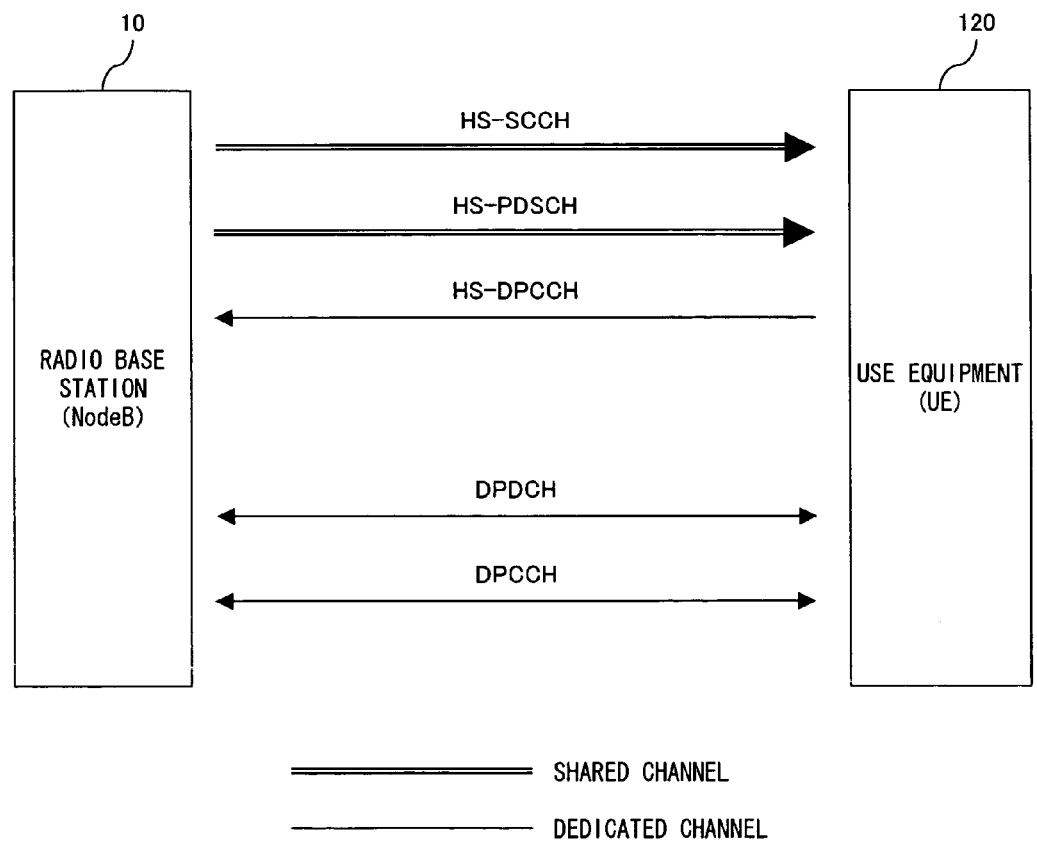
F I G. 7

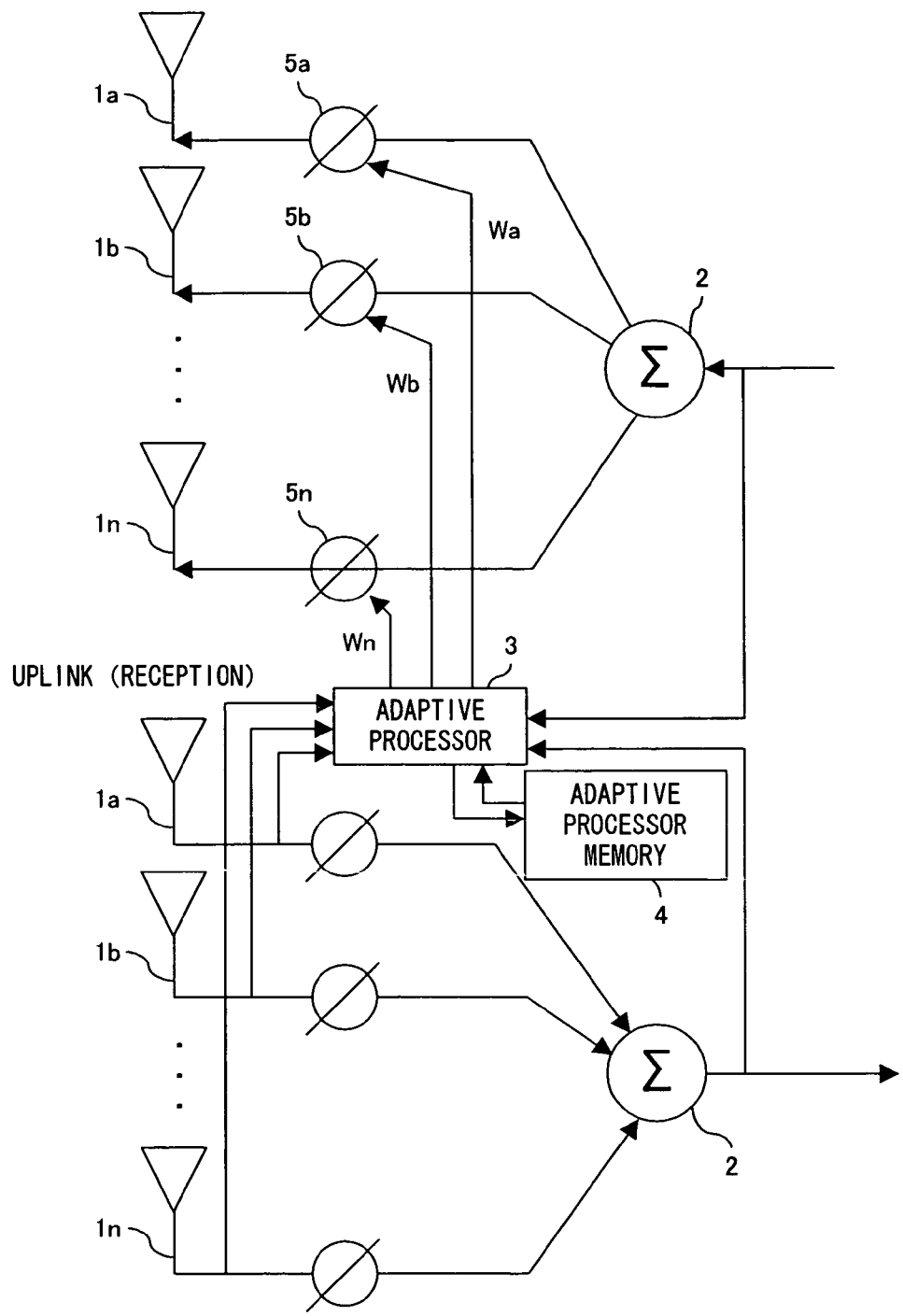
F I G. 9

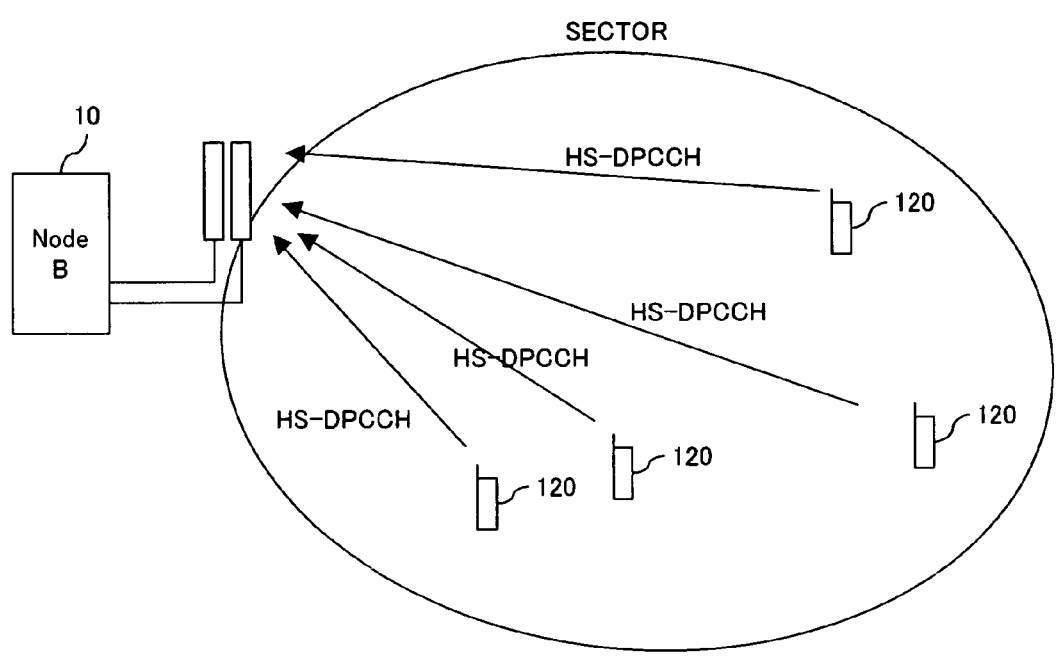
F I G. 1 1

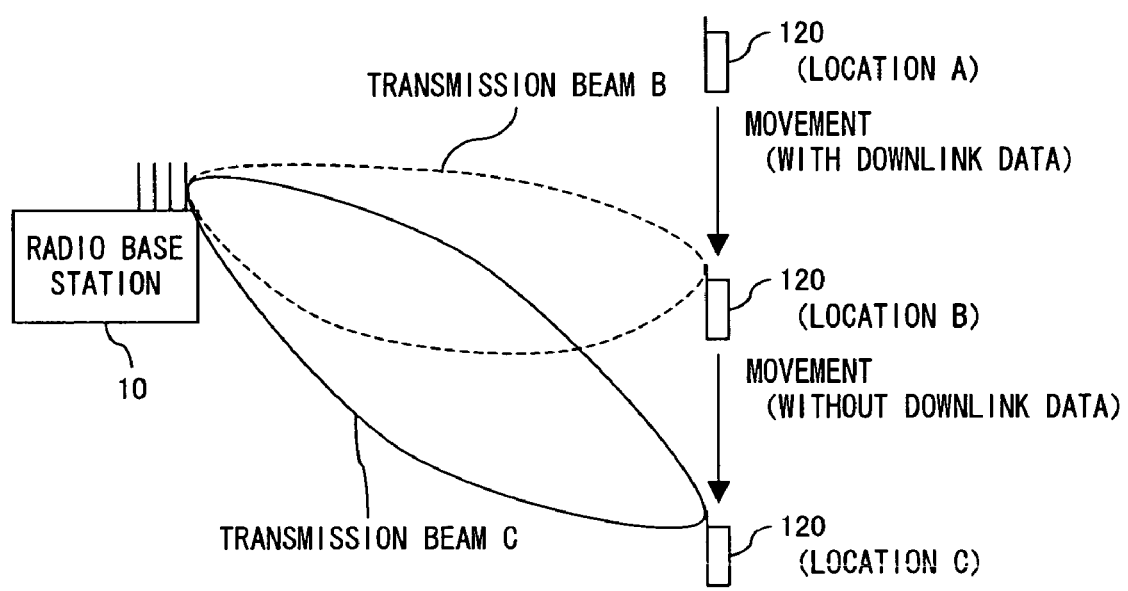
F I G. 19

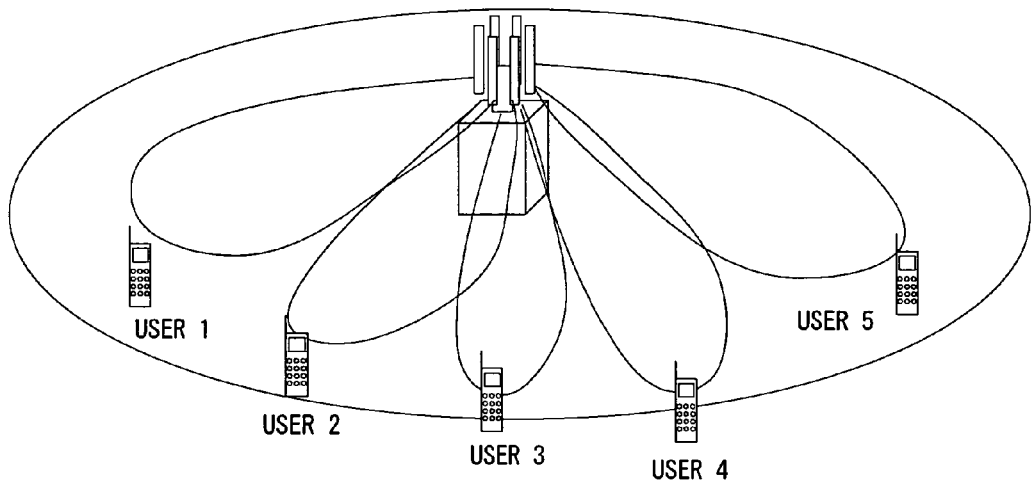
F I G. 2 1 A
|  | USER 1 | USER 2 | USER 3 | USER 4 | USER 5 | TOTAL |
|---|---|---|---|---|---|---|
| ANTENNA A (Wa) | 10 | 4 | 3 | 1 | 1 | 19 |
| ANTENNA B (Wb) | 2 | 10 | 5 | 2 | 1 | 19 |
| ANTENNA C (Wc) | 2 | 4 | 5 | 4 | 3 | 18 |
| ANTENNA D (Wd) | 1 | 1 | 1 | 8 | 10 | 21 |
F I G. 2 1 B

RADIO BASE STATION APPARATUS AND RADIO COMMUNICATION METHOD

BACKGROUND OF THE INVENTION

1. Field of the Invention

The present invention relates to an apparatus for transmitting a radio signal and especially relates to a radio base station apparatus for implementing signal transmission having directivity using an adaptive array antenna.

2. Description of the Related Art

At present, the operation of standardizing the third generation mobile communications system has been pursed in the 3rd Generation Partnership Project (3GPP).

FIG. 1 is a block diagram of a network related to the 3GPP system. The 3GPP system comprises an upper level network (core network (CN)) 100, a radio access network (UTRAN: UMTS (Universal Mobile Telecommunications System) terrestrial radio access network) 110 and a mobile station (user equipment (UE)) 120. Here, each radio access network 110 is provided with a radio network controller (RNC) 111 and a plurality of radio base stations (NodeBs) 112.

The interface between the radio base station (NodeB) 112 and the user equipment (UE) 120 is named as [Uu], and the physical bearer is radio transmission. Furthermore, the interfaces between the radio base station (NodeB) 112 and the radio network controller (RNC) 111, between the radio network controller (RNC) 111 and the core network (CN) 100 and between the radio network controllers (RNCs) 111 are named as [Iub], [Iu] and [Iur], respectively. The physical bearers are fixed lines. In the above-mentioned system, it is defined that a direction from the core network (CN) 100 to the user equipment (UE) 120 is a downlink (DL), while the direction from the user equipment (UE) 120 to the core network (CN) 100 is an uplink (UL).

In the above-mentioned system, the user equipment (UE) 120 is accommodated in the nearest radio base station (NodeB) 112 and receives/transmits data from/to the other terminal via the radio base station (NodeB) 112.

In a radio base station of the 3GPP system, an adaptive array antenna is often provided. The adaptive array antenna is provided with a plurality of antenna elements. By appropriately controlling the weight of transmission electric power of each antenna element, radio communications having directivity as shown in FIG. 2 can be implemented. That is, when a signal is received from a user equipment, the weight of each antenna is appropriately controlled so as to optimize a reception property. Consequently, a directivity pattern can be offered by directing a main lobe in the coming direction of a desired wave signal and by directing a beam null in the coming direction of an interference wave. In this way, the effect of an interference wave is decreased and high-quality data can be received so that the capacity of an uplink increases.

In the transmission of a signal to a user equipment, on the other hand, a directivity pattern such that a main lobe is directed toward the position of a target user equipment by appropriately controlling the weight of each antenna element for each user equipment, is offered. Thus, the interference given to the other user equipment can be decreased so that the capacity of a downlink increases.

FIG. 3 is a block diagram of an adaptive array antenna system. In the adaptive array antenna system, an adaptive processor 130 calculates a weight for each antenna element in order to optimize the quality of a composite signal obtained by composing signals received via the plurality of antenna elements 1a through 1n. At this time, the weight for an antenna element corresponding to the coming direction of a desired wave is weighed, while the weight for an antenna element corresponding to the coming direction of an interference wave is reduced. In the transmission of a signal to a user equipment, a transmission beam having directivity is formed using the weights calculated based on the receipt signal from the user equipment.

In this way, in the adaptive array system, the weight for each antenna element is calculated based on the receipt signal from a user equipment and a signal is transmitted to the user equipment using the weights. That is, the directivity for signal transmission is determined using a signal from the user equipment as feedback information.

In a W-CDMA method, which is being standardized by the 3GPP, HSDPA (High Speed Downlink Packet Access) is defined to realize high-speed data transmission. HSDPA is a communication method of offering a maximum transmission rate of 14 Mbps at a downlink and performs adaptive code modulation for adaptively changing QPSK/16-QAM, etc. depending on the radio environments between a radio base station and a user equipment.

In the following patent documents 1 through 4, technologies regarding the 3GPP, an antenna having directivity and HSDPA are described.

The patent document 1 describes a technology of controlling transmission power in a radio base station based on information about communication quality notified from a user equipment, in the 3GPP system. The patent document 2 describes a technology of implementing signal transmission having individual directivity for each user equipment, in a W-CDMA system. The patent document 3 describes a technology of individually controlling the directivity of the transmission beams of a data channel and a control channel, in a W-CDMA system. The patent document 4 describes a technology of controlling the transmission from a radio base station to a user equipment based on the communication quality at the time of both data receipt and data waiting, in a W-CDMA system.

[Patent document 1] Japanese laid-open patent publication No. 2002-325063 (FIG. 1, paragraphs 0042 and 0043)

[Patent document 2] Japanese laid-open patent publication No. 2001-339758 (paragraphs 0002 through 0007)

[Patent document 3] Japanese laid-open patent publication No. 2003-298498 (FIG. 2, paragraph 0021)

[Patent document 4] Japanese laid-open patent publication No. 2003-318861 (Abstract)

In HSDPA, uplink data from a user equipment to a radio base station is transmitted via a dedicated channel, while downlink data from a radio base station to a user equipment is transmitted via a shared channel. Specifically, on the Uu interface, the uplink data is transmitted via an HS-DPPCH (HS-dedicated physical control channel), while downlink data is transmitted via an HS-PDSCH (HS-physical downlink shared channel), as shown in FIG. 4.

A dedicated channel is a channel occupied by one user or one user equipment. Therefore, in a case where data is transmitted via the dedicated channel, a radio base station can enhance the communication efficiency as a whole system by directing the directivity of an adaptive array antenna toward the position of the user equipment.

A shared channel, on the other hand, is a channel occupied by a plurality of users or a plurality of user equipments. Therefore, in a case where data is transmitted via the shared channel, a radio base station must communicate all the user equipments that share the shared channel. Accordingly, in this case, a base station transmits the identical signals to the whole sector without causing a transmission beam to have directivity as shown in FIG. 5.

In a case where HSDPA is selected in the 3GPP system in this way, a shared channel is used for the transmission of downlink data from a radio base station to a user equipment so that the radio base station transmits a signal using uniform electric power in all the directions in a corresponding radio communication sector. Accordingly, power consumption in the radio base station becomes larger in comparison with the case of transmitting a signal having directivity in a specific direction. Especially, in HSDPA, a data transmission rate is high and transmission power is large so that the influence given to other channels as an interference wave is large. Furthermore, when signals are uniformly transmitted in all directions in a sector, the number of reflection waves increases as shown in FIG. 6 and the interference problem under a multi-path environment cannot be ignored. This problem is of importance in an urban area where there are many high-rise buildings.

SUMMARY OF THE INVENTION

A subject of the present invention is to enhance the communication quality when data is transmitted using the shared channel of a radio base station. In addition, another subject of the present invention is to suppress the power consumption of a transmission apparatus when data is transmitted using the shared channel of a radio communication system.

A radio base station apparatus of the present invention is a radio base station apparatus for transmitting, using a downlink shared channel shared by a plurality of user equipments, signals to the plurality of user equipments and for receiving signals from each user equipment via an uplink dedicated channel. This apparatus comprises a plurality of antenna elements for transmitting/receiving radio signals; a detection unit for detecting information about an uplink dedicated channel corresponding to a first user equipment from signals received via the plurality of antenna elements; a directivity control unit for determining the directivity of transmission power based on the information detected by the detection unit when a signal is transmitted to the first user equipment via the downlink shared channel; and a transmission unit for transmitting the signal with the directivity determined by the directivity control unit.

According to this invention, when a signal is transmitted to the first user equipment using the downlink shared channel, information about an uplink dedicated physical channel corresponding to the first user equipment is detected. In this way, the position of the first user equipment can be recognized in real time. Then, the directivity of transmission power for transmitting a signal to the first user equipment is determined based on this information. Accordingly, in a case where using a downlink shared channel shared by a plurality of user equipments, signals are transmitted to the plurality of user equipments, signal transmission is implemented using a transmission beam having directivity.

A radio base station apparatus according to another aspect of the present invention can use a downlink shared channel shared by a plurality of user equipments and a downlink dedicated channel set for each user equipment, as a communication channel for transmitting a signal to a user equipment. This apparatus comprises a plurality of antenna elements for transmitting/receiving radio signals; a detection unit for detecting, when the downlink shared channel is used, information about a signal received via the first uplink channel corresponding to the downlink shared channel and detecting, when the downlink dedicated channel is used, information about a signal received via a second uplink channel corresponding to the downlink dedicated channel; a directivity control unit for determining directivity of transmission power based on the information detected by the detection unit; and a transmission unit for transmitting signals using directivity determined by the directivity control unit. When the communication channel for transmitting a signal to a user equipment is switched from the downlink dedicated channel to the downlink shared channel, the directivity control unit determines the directivity of transmission power at the time of transmitting a signal via the downlink shared channel, using the information about a signal received via the second uplink channel.

According to this invention, immediately after the downlink communication channel for transmitting data to the user equipment is switched, the directivity of transmission power is controlled using the directivity information calculated before this switching. Therefore, even immediately after the communication channel is switched, a transmission beam with appropriate directivity can be quickly formed.

According to the present invention, even in a case where signals are transmitted to a plurality of user equipments using a downlink shared channel shared by the plurality of user equipments, signal transmission can be implemented using a transmission beam with directivity. Therefore, the interference among channels can be suppressed so that the communication quality is enhanced. In addition, the power consumption of the radio base station apparatus is decreased.

BRIEF DESCRIPTION OF THE DRAWINGS

FIG. 3 is a block diagram showing an adaptive array antenna system;

FIG. 4 explains the Uu interface of HSDPA;

FIG. 5 shows a radio base station and the sector;

FIG. 7 shows main channels set between the radio base station and a user equipment;

FIG. 9 is a block diagram of an adaptive array antenna system provided with the radio base station;

FIG. 11 shows a condition in which a plurality of user equipments are accommodated in the radio base station;

FIG. 19 explains the effects in the embodiment shown in FIG. 18;

FIG. 21A shows a transmission beam when a plurality of users are code-multiplexed; and FIG. 21B shows examples of weight information of a plurality of code-multiplexed users.

DESCRIPTION OF THE PREFERRED EMBODIMENTS

Figure 1:
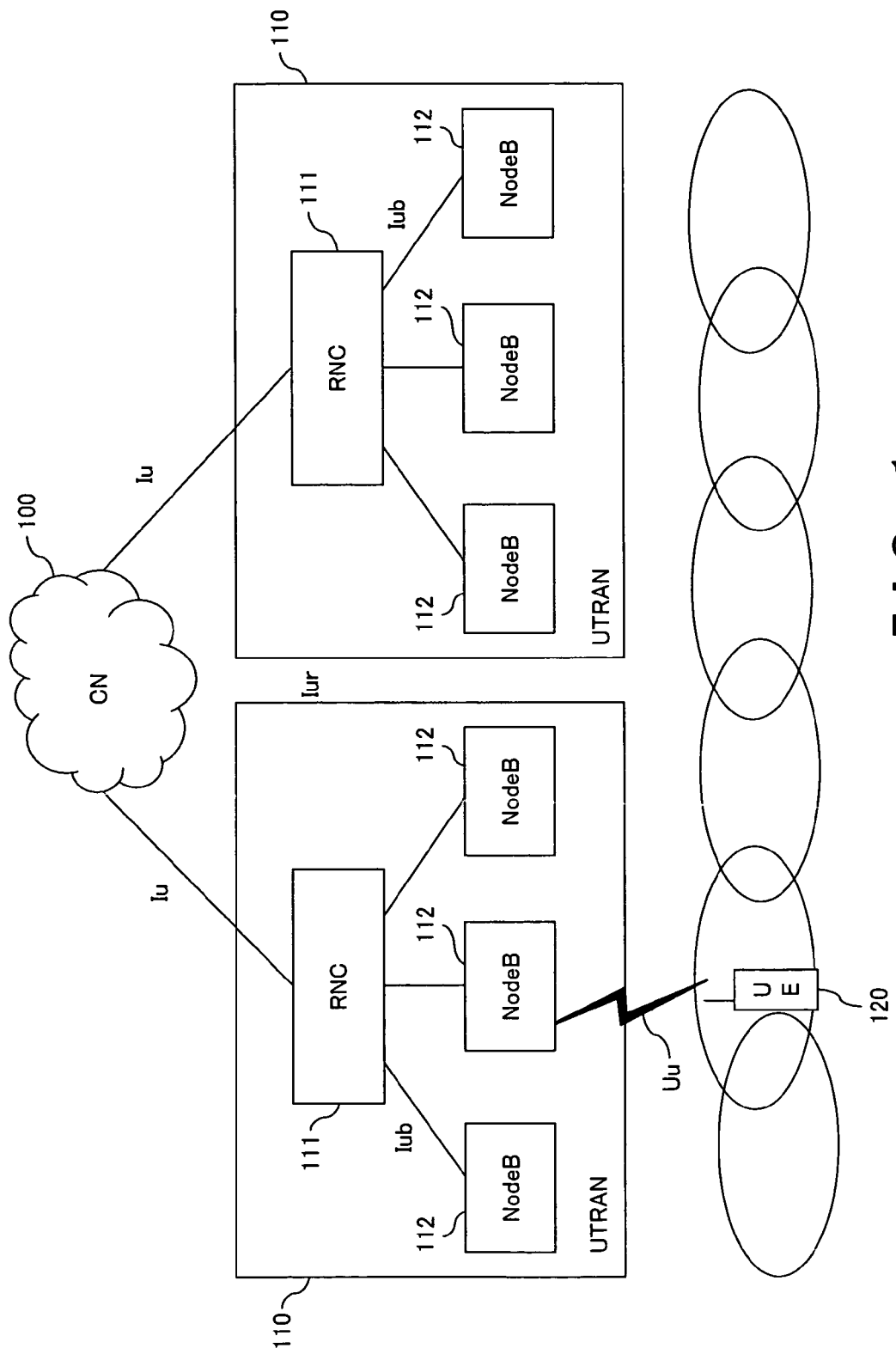
FIG. 1 is a block diagram showing the network related to 3GPP system.
Figure 2:
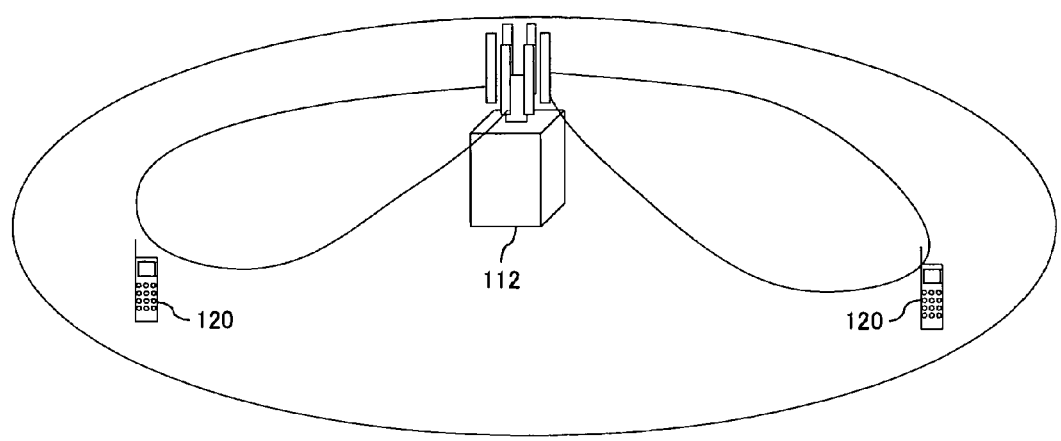
FIG. 2 shows directivity using an adaptive array antenna.
Figure 6:
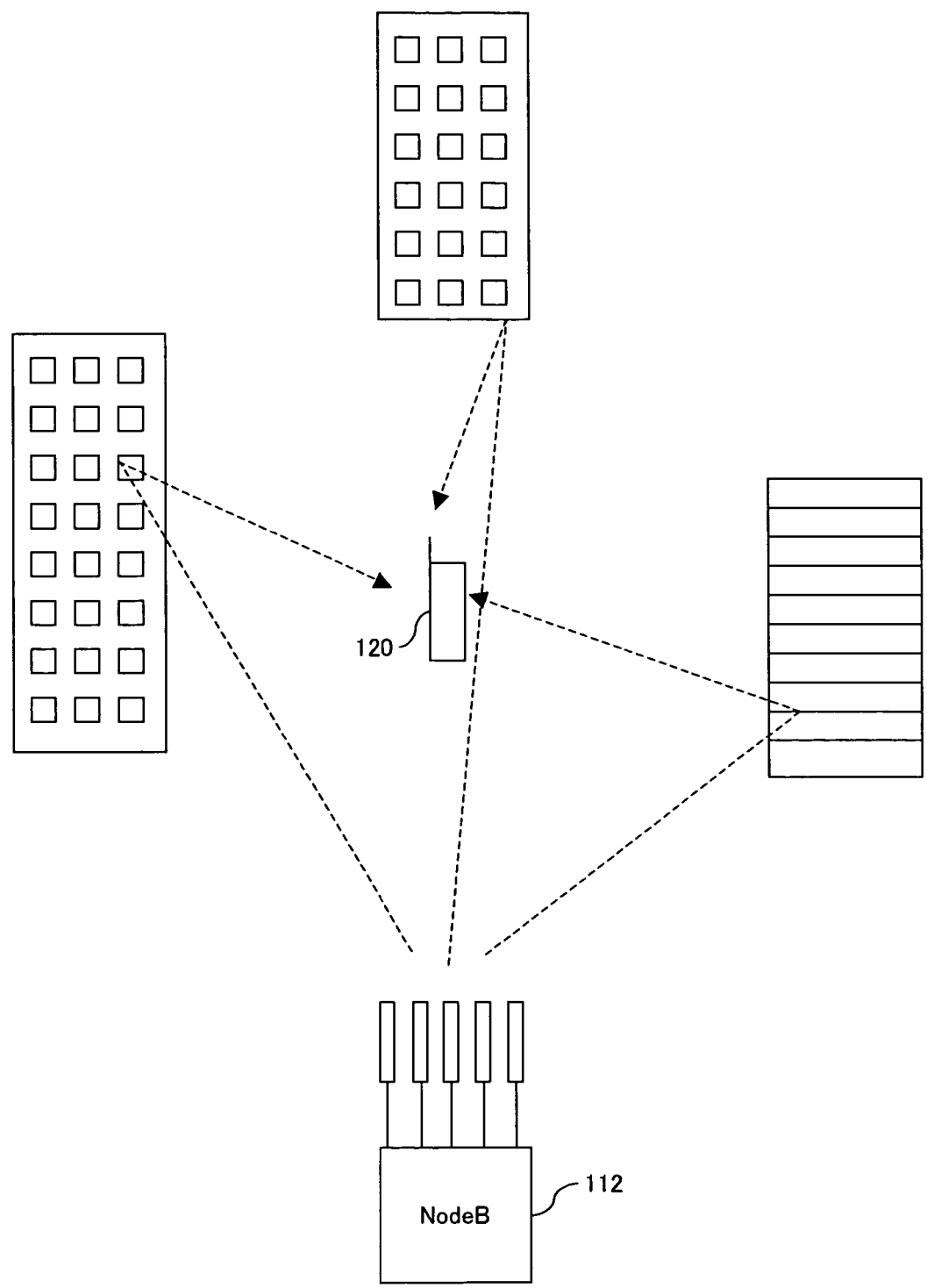
FIG. 6 shows a multi-path environment.

The following is the explanation of the embodiments of the present invention in reference to the accompanying drawings. The present invention is not limited to the 3GPP system. In this specification, however, the embodiments applied to the system shown in FIG. 1 are explained.

In the 3GPP system of the embodiment, as shown in FIG. 7, a high speed shared control channel (HS-SCCH), an HS-physical downlink shared channel (HS-PDSCH) and an HS-dedicated physical control channel (HS-DPCCH) are set on Uu interface between a radio base station (NodeB) 10 and the user equipment (UE) 120 as a radio channel used for high speed downlink packet access (HSDPA).

Both the high speed physical downlink shared channel HS-PDSCH and high speed shared control channel HS-SCCH are shared channels in a downlink direction (that is, the direction from the radio base station 10 to the user equipment 120). Here, the high speed physical downlink shared channel HS-PDSCH mainly transmits user data. The high speed shared control channel HS-SCCH, on the other hand, is a control channel for transmitting various parameters regarding the data to be transmitted via the high speed physical downlink shared channel HS-PDSCH. As the parameters, information about a modulation method or information about the allocation of a spreading code is transmitted.

The high speed dedicated physical control channel HS-DPCCH is a control channel in an uplink direction (that is, the direction from the user equipment 120 to the radio base station 10) and this channel is individually set for each user or each user equipment. This control channel transmits, for example, an ACK/NACK signal or CQI (Channel Quality Indicator) information from a user equipment to a radio base station. The ACK/NACK signal indicates whether or not data to be transmitted via the high speed physical downlink shared channel HS-PDSCH is received. In addition, the CQI information indicates the communication quality between a radio base station and a user equipment, which is detected in the user equipment.

On the Uu interface between the radio base station 10 and the user equipment 120, a dedicated physical data channel DPDCH and a dedicated physical control channel DPCCH are further set. Here, these channels are individually set for each user or each user equipment. The dedicated physical data channel DPDCH is a channel for data transmission and the data rate is variable. The dedicated physical control channel DPCCH transmits control information for the dedicated physical data channel DPDCH.

In a system of the embodiment, the high speed physical downlink shared channel HS-PDSCH and the dedicated physical data channel DPCCH can beset. These channels can be switched, for example, in accordance with the traffic volume of data from the radio base station 10 to the user equipment 120. In this case, in a case where the traffic volume is equal to or less than a predetermined threshold value, the dedicated physical data channel DPDCH may be selected, while in a case where the traffic volume exceeds the threshold value, a high speed physical downlink shared channel HS-PDSCH may be selected.

Figure 8A:
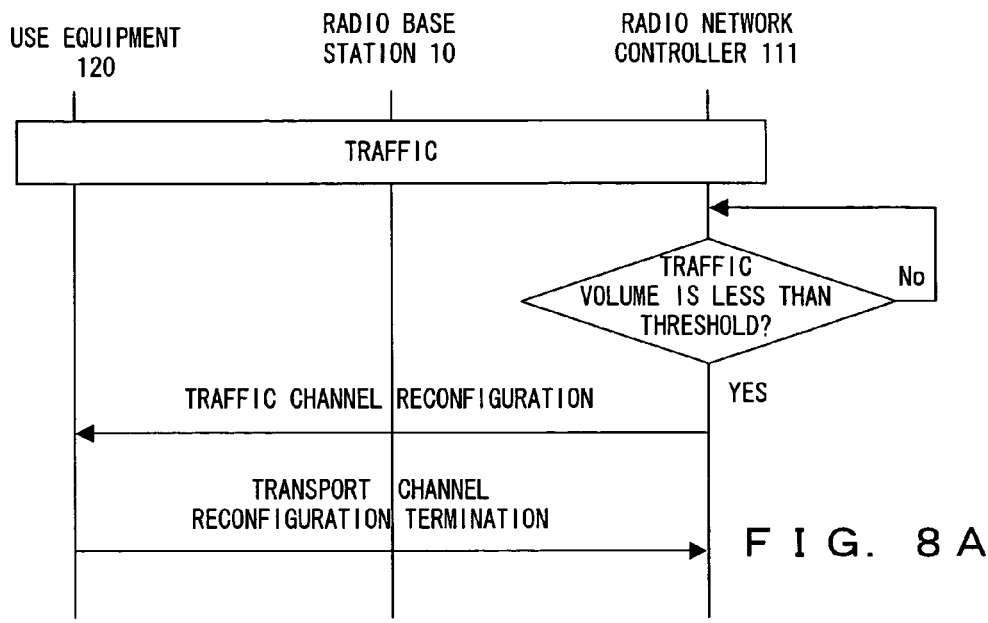
FIGS. 8A and 8B show sequences of channel switching.

FIG. 8A shows a sequence of switching a downlink communication channels in a case where traffic volume decreases. Here, it is assumed that data is being transmitted using the high-speed physical down link shared channel HS-PDSCH.

The traffic of data transmitted from the radio base station 10 to the user equipment 120 is monitored at all time by the radio network controller 111. When the traffic volume is equal to or less than the predetermined threshold value, the radio network controller 111 notifies this fact to the user equipment 120 using a transport channel reconfiguration massage. Then, the user equipment 120 returns a transport channel reconfiguration termination massage to the radio network controller 111. At this time, these messages are transferred via the radio base station 10. Accordingly, a communication channel for data transmission from the radio base station 10 to the user equipment 120 is switched from the high speed physical downlink shared channel HS-PDSCH to the dedicated physical data channel DPDCH.

Figure 8B:
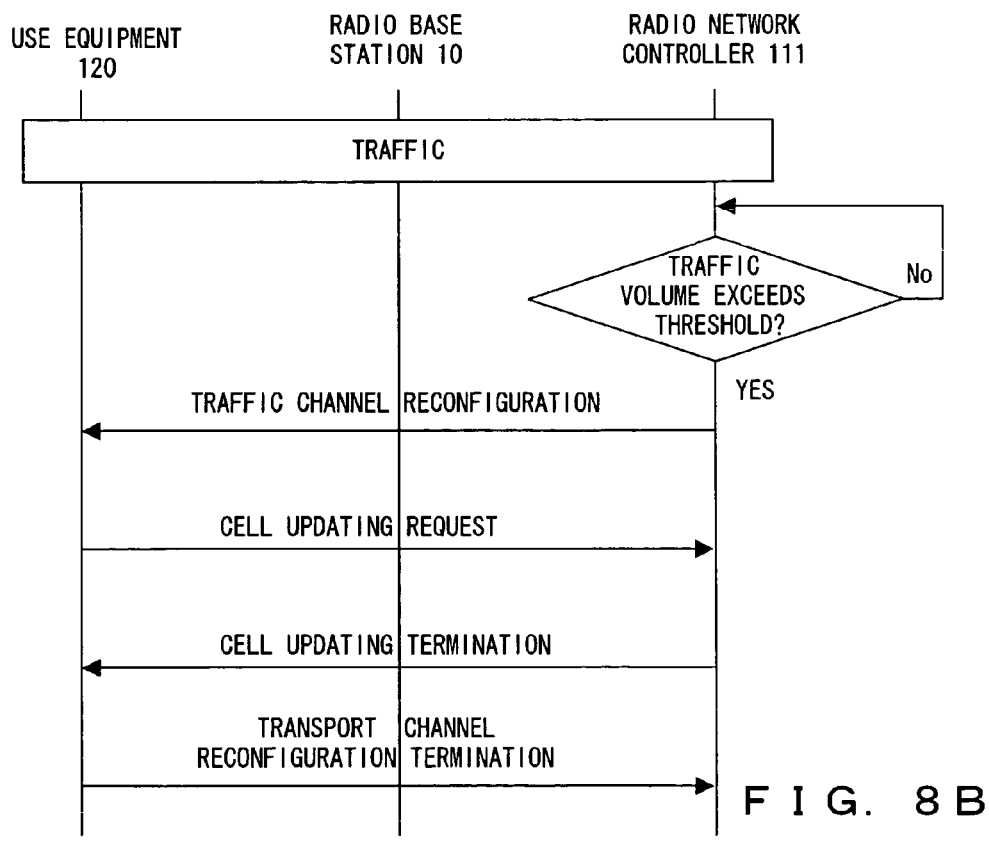

FIG. 8B shows a sequence of switching the communication channel of a downlink in a case where the traffic volume increases. Here, it is assumed that data is being transmitted using the dedicated physical data channel DPDCH.

When the traffic volume of data transmitted from the radio base station 10 to the user equipment 120 exceeds the predetermined threshold value, the radio network controller 111 notifies this fact to the user equipment 120 using a transport channel reconfiguration massage. In a case where the high speed physical downlink shared channel HS-PDSCH can be used, the user equipment 120 transmits a cell updating request message to the radio network controller 111. When the radio network controller 111 receives the cell updating request message, it transmits a cell updating termination message to the user equipment 120. Then, the user equipment 120 returns the transport channel reconfiguration termination message to the radio network controller 111. At this time, these messages are transferred via the radio base station 10. Accordingly, a communication channel for the data transmission from the radio base station 10 to the user equipment 120 is switched from the dedicated physical data channel DPDCH to the high speed physical downlink shared channel HS-PDSCH.

FIG. 9 shows the configuration of an adaptive array system provided in the radio base station 10. Here, a configuration for signal transmission is drawn separately from that for signal receipt in order to clarify the drawing. Actually, however, one set of antenna elements $1a$ through $1n$, etc. are shared by the transmission and the reception of data.

The antenna elements $1a$ through $1n$ receive uplink signals from the user equipment. The uplink signals received via the antenna elements $1a$ through $1n$ are composed by a compositor/distributor 2 to be reproduced as transmission data form the user equipment 120. An adaptive processor 3 respectively detects powers of the uplink signals received via the antenna elements $1a$ through $1n$ and estimates the direction in which the user equipment 120 that transmits the uplink signal is positioned (that is, the coming direction of a target wave), based on the detection results. Then, the adaptive processor 3 calculates weights Wa through Wn according to transmission powers and sets the calculated weights at the respective antenna elements $1a$ through $1n$ at the time of transmitting downlink signals to the user equipment 120 based on the coming direction of the target wave. Specifically, weights Wa through Wn for directing the transmission beam in a direction toward the position of the user equipment 120 are calculated. A method of calculating weights in order to determine the transmission beam of an adaptive array antenna based on a reception signal is a publicly known technology so that the explanation is omitted here.

The adaptive processor 3 stores the thus-calculated weights Wa through Wn in an adaptive processor memory 4. At this time, the weights Wa through Wn are stored corresponding to a terminal ID (UD-ID) of the user terminal 120 that transmits the received uplink signal.

At the time of transmitting data to the user equipment 120, a signal carrying the data is distributed to the antenna elements 1a through in by the compositor/distributor 2. At this time, the adaptive processor 3 extracts weights Wa through Wn corresponding to the user equipment 120 to which data is transmitted, from the adaptive processor memory 4 and sets the extracted weights in multipliers 5a through 5n. The multipliers 5a through 5n multiply a transmission signal by the respectively corresponding weights Wa through Wn. That is, the transmission powers of signals outputted from the antenna elements 1a through in are controlled by the weights Wa through Wn. Consequently, a transmission beam directed toward the position of the user equipment 120 is formed.

According to this adaptive array antenna system, when the user equipment 120 moves, the powers of uplink signals received via the antenna elements 1a through 1n change, thereby the weights Wa through Wn are updated. Accordingly, if a transmission beam is formed using the updated weights Wa through Wn, the signal transmission with directivity toward the target user equipment 120 can be implemented all the time. That is, the power consumption can be decreased and at the same time, the interference to other channels can be suppressed.

Figure 10:
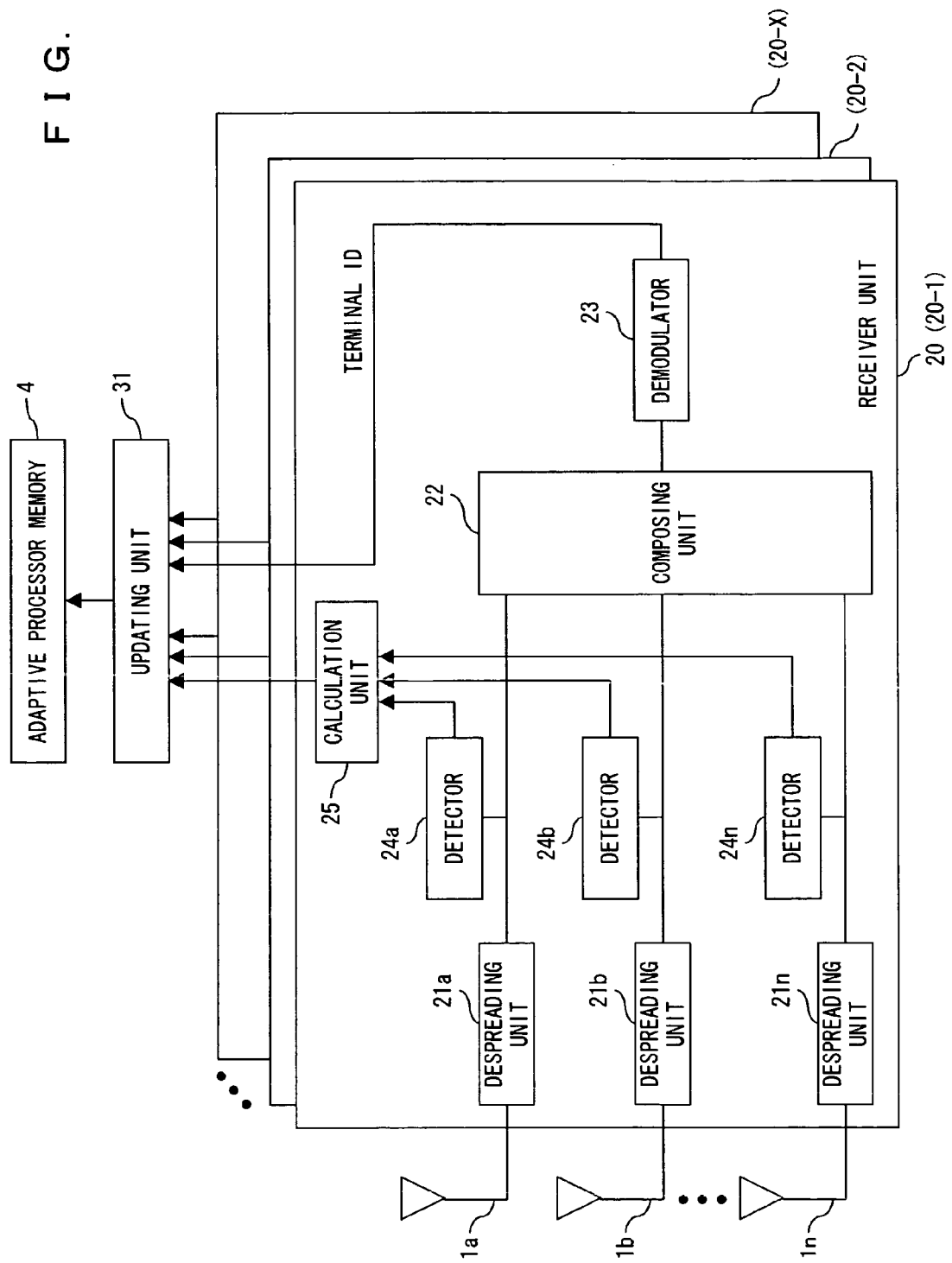
FIG. 10 is a function block diagram of a receiver unit of the adaptive array antenna system shown in FIG. 9.

FIG. 10 is a function block diagram of a receiver unit of the adaptive array antenna system shown in FIG. 9. The adaptive array antenna system of the embodiment comprises a plurality of receiver units 20 (20-1 through 20-X). Each receiver unit 20 may be allocated to, for example, each user equipment or each user accommodated in the radio base station 10, or each dedicated channel.

The uplink signals received via the antenna elements 1a through 1n are despread by despreading units 21a through 21n, and guided to a composing unit 22. The composing unit 22 corresponds to the composer/distributor 2 shown in FIG. 9. Here, the spreading codes which have been allocated to the corresponding user equipments are assigned in advance to the respective despreading units 21a through 21n. For example, it is assumed that spreading codes 1, 2, . . . , X are allocated to user equipments 120-1, 120-2, . . . , 120-X accommodated in the radio base station 10. Then, in a case where an uplink signal from the user equipment 120-1 is received by the receiver unit 20-1, a spreading code 1 is assigned to each of the despreading units 21a through 21n of the receiver unit 20-1. In a case where an uplink signal from the user equipment 120-2 is received by the receipt part 20-2, a spreading code 2 is assigned to each of the despreading units 21a through 21n of the receiver unit 20-2. Due to this allocation, although the uplink signals transmitted from the user equipment 120-1 are inputted into all the receipt parts 20-1, 20-2, . . . , 20-x, these signals are reproduced only in the receiver unit 20-1. That is to say, in this case, the uplink signals transmitted from the user equipments 120-1, 120-2, . . . , 120-X are detected by the receiver unit 20-1, 20-2, . . . , 20-X, respectively.

The output of the composing unit 22 is demodulated by a demodulator 23. That is, the modulator 23 reproduces data transmitted from the user equipment 120. At this time, the modulator 23 extracts the terminal ID of a user equipment that transmits the data, from the reproduced data and notifies the extracted ID to an updating unit 31.

Detectors 24a through 24n detect the intensities (for example, power or amplitude of received signals) of uplink signals received via the respective antenna elements 1a through in. Here, the uplink signals received by the antenna elements 1a through in are despread by the respective despreading units 21a through 21n using the predetermined spreading code. Therefore, the detectors 24a through 24n detect the intensities of the received signals (or uplink channels) from particular user equipment 120 in respect of the corresponding antenna elements 1a through 1n.

A calculation unit 25 calculates weights Wa through Wn for forming a transmission beam directing toward the position of the user equipment 120 that transmits the uplink signal based on the detection results obtained by the detectors 24a through 24n. The updating unit 31 stores the weights Wa through Wn calculated by the calculation unit 25 in the adaptive processor memory 4. At this time, the updating unit 31 stores the weights Wa through Wn calculated by the calculation unit 25 in the adaptive processor memory 4 corresponding to a terminal ID notified from the modulator 23. Meanwhile, the adaptive processor 3 shown in FIG. 9 offers functions possessed by both the calculation unit 25 and the updating unit 31.

FIG. 11 shows the condition in which a plurality of user equipments are accommodated in a radio base station. In the example shown in FIG. 11, the high speed physical downlink shared channel HS-PDSCH is used for the data transmission from the radio base station 10 to each user equipment 120. In addition, each user equipment 120 transmits a control signal (for example, ACK/NACK signal, etc.) to the radio base station 10 using the high speed dedicated physical control channel HS-DPCCH. In this case, in the radio base station 10, the receiver unit 20 is allocated for each high speed dedicated physical control channel HS-DPCCH and each receiver unit 20 calculates weights Wa through Wn while using the reception power value of the corresponding high speed dedicated physical control channel HS-DPCCH as feedback information. Then, the radio base station 10 transmits a signal with different directivity for each user equipment using the weights Wa through Wn thus-calculated for each user equipment.

Figure 12:
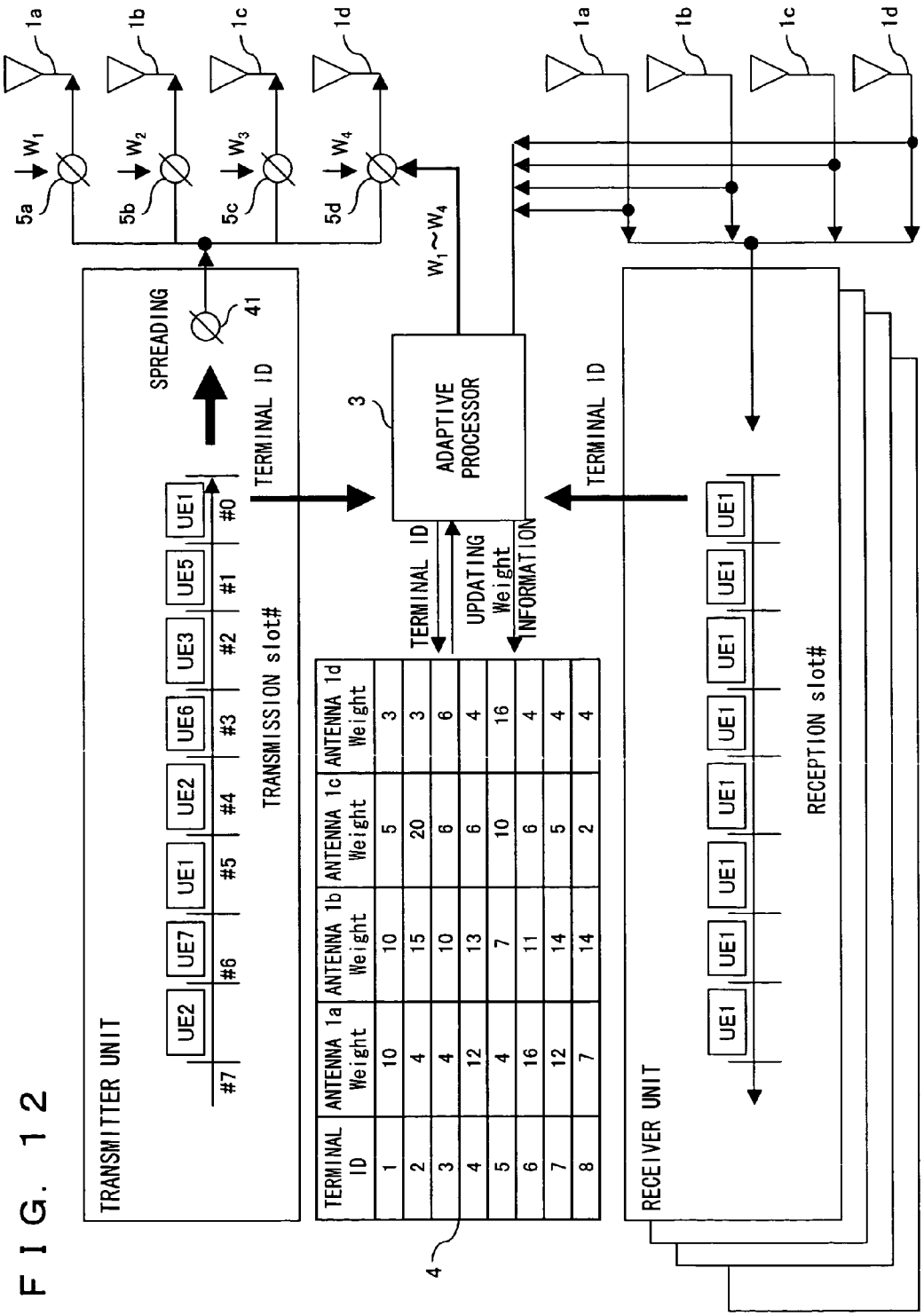
FIG. 12 explains basic operations of the radio base station of an embodiment of the present invention.

FIG. 12 explains the basic operations of the radio base station 10. It is assumed that an adaptive array antenna system provided in the radio base station 10 comprises four antenna elements 1a through 1d. In addition, it is assumed that eight user equipments (terminal ID=1 through 8) are accommodated in the radio base station 10. Furthermore, it is assumed that a dedicated channel is set as an uplink channel (that is, reception from the user equipment 120), while a shared channel is set as a downlink channel (that is, transmission to the user equipment 120). Meanwhile, it is assumed that the downlink is shared by a plurality of user equipments in a time division multiplexing method.

The adaptive processor 3 calculates the weights Wa through Wd of transmission power of the respective antenna elements 1a through 1n based on the uplink signals received from each user equipment 120 as explained in reference to FIGS. 9 and 10, and stores the calculation results in the adaptive processor memory 4. At this time, the respective weights Wa through Wd are stored while using the terminal IDs of the corresponding user equipments 120 as address keys. The process of calculating and storing the weights Wa through Wn is repeatedly performed at predetermined time intervals. That is, the weights stored in the adaptive processor memory 4 are updated at particular interval. This process is performed in parallel for a plurality of uplinks (that is, here, in respect of a plurality of user equipments).

The signal to be transmitted to the user equipment 120 is carried in a time division multiplexing method via a shared link shared by a plurality of user equipments. That is, transmission time slots are sequentially allocated to the data to be transmitted by the not-drawn scheduler. In the example shown in FIG. 11, "data to a user equipment UE1", "data to a user equipment UE5", "data to a user equipment UE3", etc. are allocated to the transmission time slots #0, #1, #2, etc.

When, for example, "data to a user equipment UE1" allocated to the time slot #0 is transmitted, the data is spread in a spreading unit 41 and guided to the plurality of antennas 1a through 1d. At this time, a terminal ID of the user equipment 120 (UE1) that is the destination of the data is notified to the adaptive processor 3. Then, the adaptive processor 3 extracts one set of corresponding weights Wa through Wn (10,10,5,3) from the adaptive processor memory 4 using the terminal ID as a retrieval key, and gives the extracted one set of weights to the multipliers 5a through 5d. Consequently, "data to a user equipment UE1" is transmitted with directivity toward the user equipment 120 (UE1). Subsequently, when "data to a user equipment UE5" allocated to the time slot #1 is transmitted, the adaptive processor 3 extracts one set of corresponding weights Wa through Wn (4,7,10,16) from the adaptive processor memory 4 using the terminal ID of the user equipment UE5 as a retrieval key, and gives the extracted one set of weights to the multipliers 5a through 5d. Consequently, "data to a user equipment UE5" is transmitted with directivity toward the user equipment 120 (UE5). Similarly, signals on the downlink shared channel are continuously transmitted, while switching directivity in accordance with a destination of the signal.

Figure 13A:
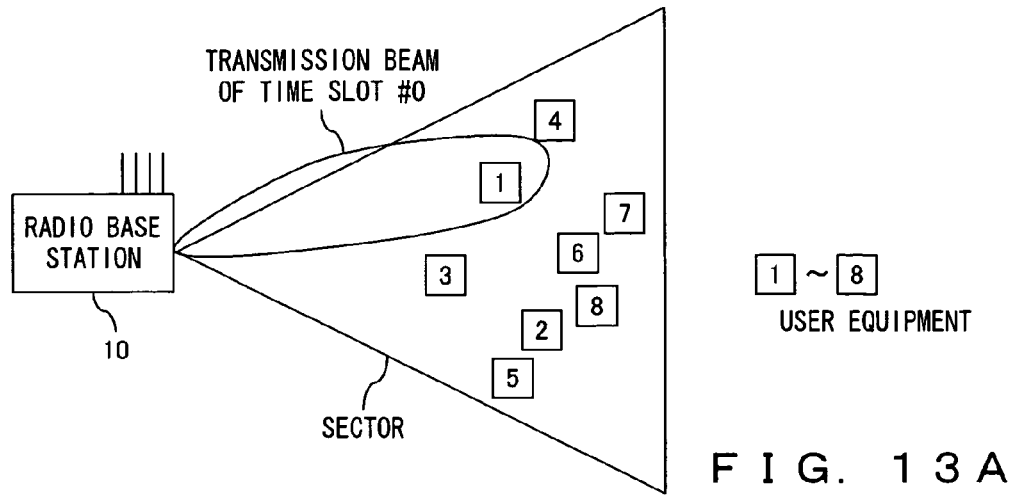
FIGS. 13A through 13C shows transmission beams formed by the radio base stations.
Figure 13B:
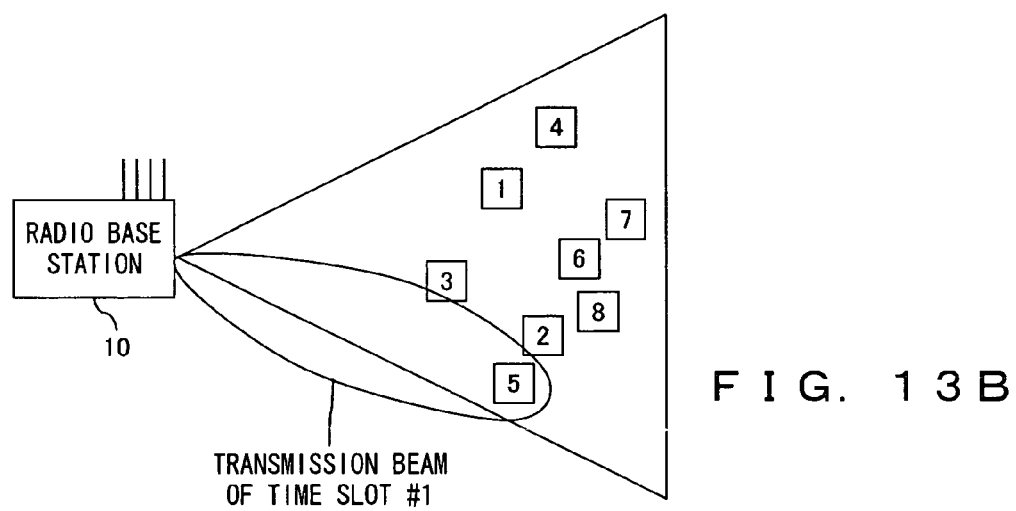
Figure 13C:
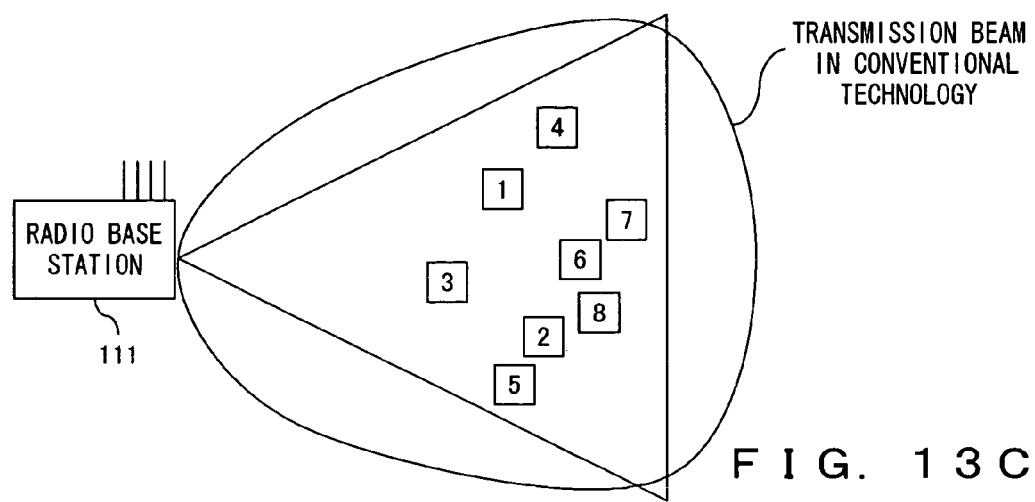

FIGS. 13A to 13C show transmission beams formed by a radio base station. FIGS. 13A and 13B respectively show transmission beams in time slots #0 and #1 of the embodiment shown in FIG. 12. A transmission beam with directivity toward the user equipment 120 (UE1) is formed in the time slot #0, while a transmission beam with directivity toward the user equipment 120 (UE5) is formed in the time slot #1.

FIG. 13C shows the transmission beam formed by a conventional technology. In the conventional technology, at the time of signal transmission of a downlink shared channel, a transmission beam that covers the whole sector is formed in such a way that a signal can be received by all the user equipments in the sector. Therefore, in the conventional technology, the power consumption is large.

Figure 14:
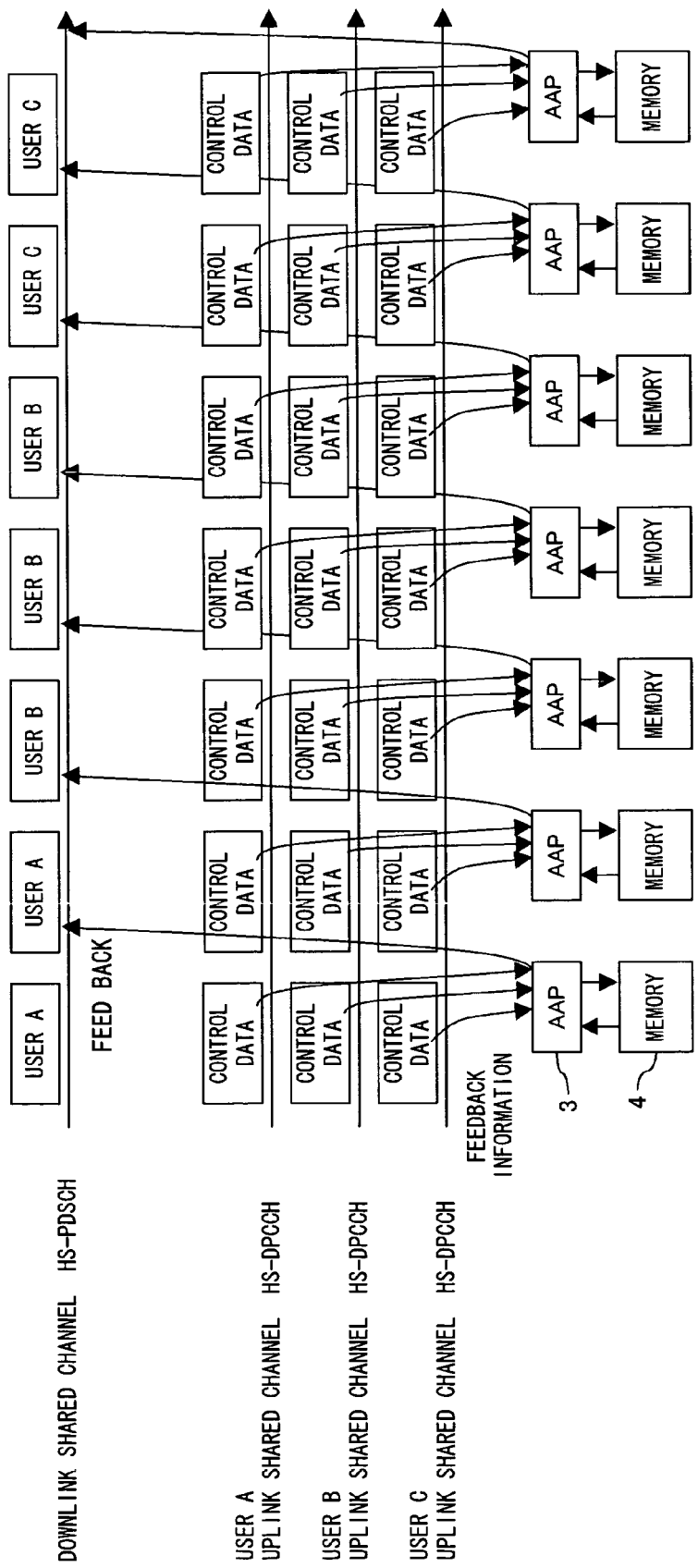
FIG. 14 shows the embodiment of basic operations of the radio base station.

FIG. 14 shows an embodiment of basic operations of the radio base station 10. Here, three user equipments (users A, B and C) are accommodated in the radio base station 10. The data from the radio base station 10 to the users A through C are time-division-multiplied on one high-speed physical downlink shared channel HS-PDSCH. Furthermore, control data from the respective users A through C to the radio base station 10 are transmitted using the high speed dedicated physical control channel HS-DPCCH.

The radio base station 10 detects reception power of each high speed dedicated physical control channel HS-DPCCH at predetermined time intervals. Then, the adaptive processor 3 calculates weights Wa through Wn in respect of each channel and writes the calculated weights in the adaptive processor memory 4 using the respective terminal IDs as address keys. That is, the adaptive processor memory 4 is updated all the time.

When data is transmitted via the high-speed physical downlink shared channel HS-PDSCH, the terminal ID of a destination of the data is notified to the adaptive processor 3. Then, the adaptive processor 3 extracts corresponding weighs Wa through Wn from the adaptive processor memory 4 using the notified terminal ID. For example, in a case where data is transmitted to the user A in a certain time slot, the corresponding weights Wa through Wn are extracted using a terminal ID of the user A. Then, the extracted weights Wa through Wn are given to the multipliers 5a through 5n as shown in FIG. 9. Thus, a signal is transmitted using a transmission beam that directs toward the user of the destination.

In this way, a radio base station of this embodiment can form a transmission beam with directivity in accordance with the destination of data, even if a downlink is a shared channel shared by a plurality of user equipments.

Figure 15:
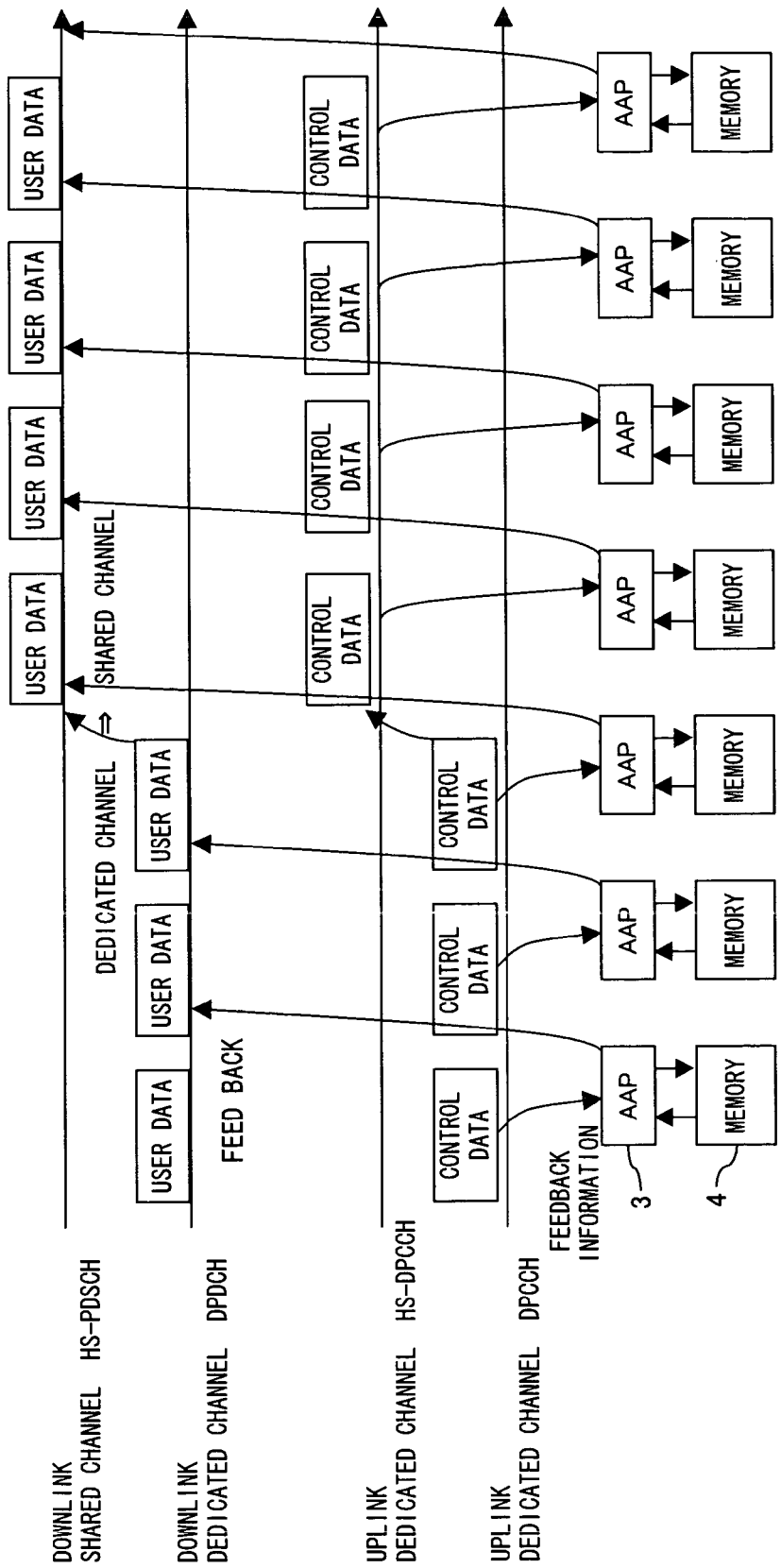
FIG. 15 shows the embodiment in the case of switching a downlink communication channel from DPDCH to HS-PDSHC.

FIG. 15 shows an embodiment in a case where traffic volume of data to be transmitted to a user equipment increases and a communication channel is switched from the dedicated physical data channel DPDCH to the high speed physical downlink shared channel HS-PDSCH. Here, the dedicated physical data channel DPDCH or the high speed physical downlink shared channel HS-PDSCH is selectively used as a communication channel of a downlink from the radio base station 10 to the user equipment 120. Furthermore, the dedicated physical control channel DPCCH is set for the dedicated physical data channel DPDCH, while the high speed dedicated physical control channel HS-DPCCH is set for the high speed physical downlink shared channel HS-PDSCH, as a communication channel for transmitting control data from the user equipment 120 to the radio base station 10.

In FIG. 15, while the traffic volume of data being transmitted to the user equipment 120 from the radio base station 10 is small, the dedicated physical data channel DPDCH is used as the downlink communication channel, and the dedicated physical control channel DPCCH is used as the uplink communication channel. In this case, the adaptive processor 3 calculates weights Wa through Wn based on the reception power of the dedicated physical control channel DPCCH, and stores the calculated weights in the adaptive processor memory 4. When data is transmitted to the user equipment 120 via the dedicated physical data channel DPDCH, the processor forms a transmission beam using the weights Wa through Wn stored in the adaptive processor memory 4. Meanwhile, procedures for forming a transmission beam with directivity when a signal is transmitted to a user equipment via a dedicated channel can be realized by a publicly known technology.

In FIG. 15, when the traffic volume increases and exceeds the predetermined threshold value, the communication channel is switched from the dedicated physical data channel DPDCH to the high speed physical downlink shared channel HS-PDSCH. With this channel switching, a control signal is transmitted from the user equipment 120 to the radio base station 10 via the high speed dedicated physical control channel HS-DPCCH. It is monitored by the radio network controller 111 whether or not the traffic volume exceeds the threshold value as explained in reference to FIG. 8A or 8B. After the negotiation between the radio network controller 111 and the user equipment 120 (or, during the negotiation), the fact is notified to the radio base station 10 and then the channels are switched.

When the above-mentioned channel switching is implemented, subsequently the adaptive processor 3 calculates weights Wa through Wn based on the reception power of the high speed dedicated physical control channel HS-DPCCH and stores the calculated weights in the adaptive processor memory 4. When data is transmitted to the user equipment 120 via the high speed physical downlink shared channel HS-PDSCH, the processor forms a transmission beam using the weights Wa through Wn stored in the adaptive processor memory 4.

However, when the first data is transmitted to the user equipment 120 via the high speed physical downlink shared channel HS-PDSCH immediately after the channel switching, the weights Wa through Wn to be calculated based on the reception power of the high speed dedicated physical control channel HS-DPCCH are not obtained yet. That is, at this time, weights Wa through Wn calculated before the channel switching based on the reception power of the dedicated physical control channel DPCCH are stored in the adaptive processor memory 4. Therefore, in the case where the first data is transmitted to the user equipment 120 via the high speed physical downlink shared channel HS-PDSCH, a transmission beam is formed using the weights Wa through Wn calculated before the channel switching based on the reception power of the dedicated physical control channel DPCCH. Consequently, immediately after the channel switching, a transmission beam with appropriate directivity can be formed.

Figure 16:
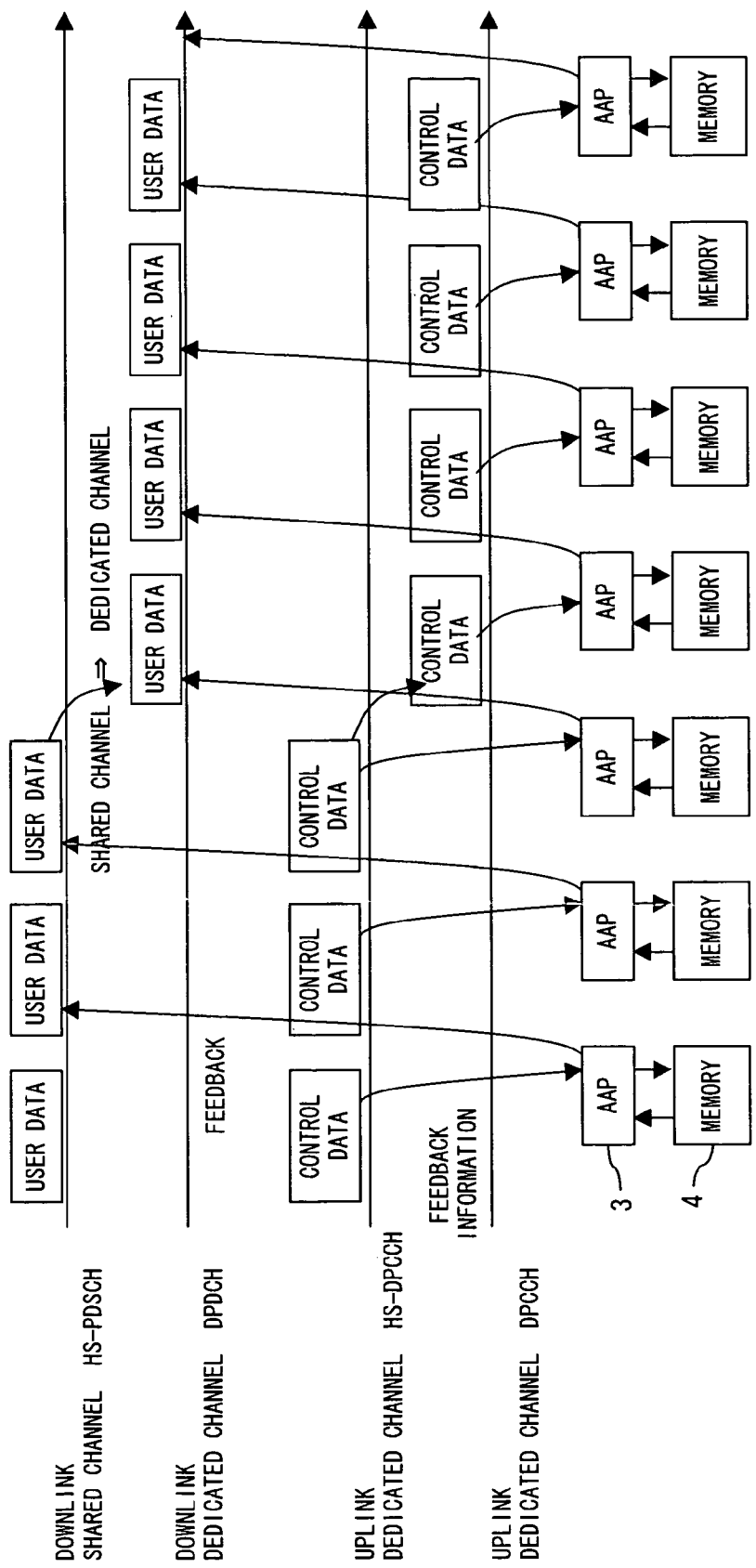
FIG. 16 shows the embodiment in the case of switching a downlink communication channel from HS-PDSHC to DPDCH.

FIG. 16 shows an embodiment in a case where traffic volume of data being transmitted to a user equipment decreases and a communication channel is switched from the high speed physical downlink shared channel HS-PDSCH to the dedicated physical data channel DPDCH. That is, the embodiment shown in FIG. 16 indicates the operations of a pattern opposite to that of the embodiment shown in FIG. 15.

In FIG. 16, while the traffic volume of data transmitted to the user equipment 120 from the radio base station 10 is large, the high-speed physical downlink shared channel HS-PDSCH is used as a downlink communication channel, and the high speed dedicated physical control channel HS-DPCCH is used as the uplink communication channel. In this case, the adaptive processor 3 calculates weights Wa through Wn based on the reception power of the high speed dedicated physical control channel HS-DPCCH and stores the calculated weights in the adaptive processor memory 4. When data is transmitted to the user equipment 120 via the high speed physical downlink shared channel HS-PDSC, the processor forms transmission beams using the weights Wa through Wn stored in the adaptive processor memory 4.

When the traffic volume decreases and becomes equal to or less than the predetermined threshold value, the communication channel is switched from the high speed physical downlink shared channel HS-PDSCH to the dedicated physical data channel DPDCH. With this channel switching, a control signal is transmitted from the user equipment 120 to the radio base station 10 via the dedicated physical control channel DPCCH. Subsequently, the adaptive processor 3 calculates weights Wa through Wn based on the reception power of the dedicated physical control channel DPCCH and forms a transmission beam using the weights Wa through Wn when the data is transmitted to the user equipment 120 via the dedicated physical data channel DPDCH.

However, when the first data is transmitted to the user equipment 120 via the dedicated physical data channel DPDCH immediately after the channel switching, a transmission beam is formed using the weights Wa through Wn calculated before the channel switching based on the high speed dedicated physical control channel HS-DPCCH.

In a radio base station of the embodiment, when a downlink channel is switched, the directivity of a transmission beam is controlled using the lastly-obtained weight information based on the reception power of an uplink channel corresponding to a channel before the channel switching, until weight information is obtained based on the reception power of an uplink channel corresponding to a channel after the channel switching.

Figure 17A:
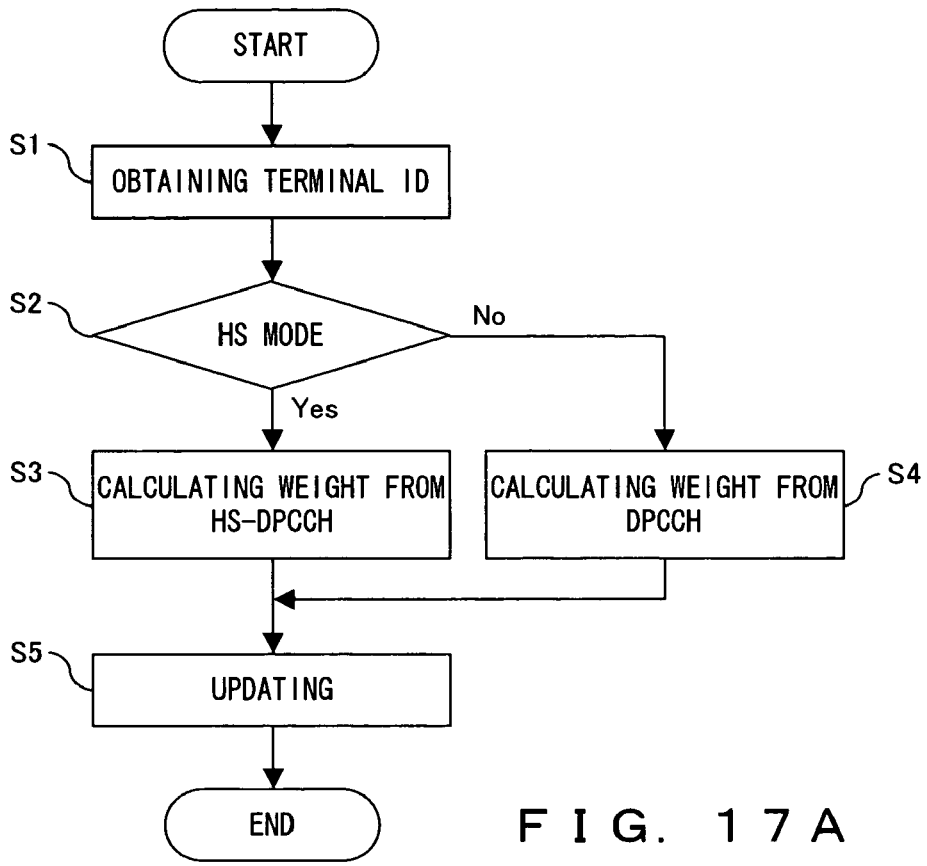
FIG. 17A is a flowchart of calculating and updating a weight.

FIG. 17A shows a flowchart of calculating and updating weights. The process of this flowchart is performed at predetermined time intervals. In addition, the process of this flowchart is performed in parallel with a plurality of uplink dedicated channels.

In step S1, the terminal ID of a user equipment that transmits the received uplink signal is obtained. In step S2, it is checked whether the high speed physical downlink shared channel HS-PDSCH or the dedicated physical data channel DPDCH is used as a communication channel for transmitting data to the user equipment. When the high speed physical downlink shared channel HS-PDSCH is used, weights are calculated in step S3 based on the reception power of the high speed dedicated physical control channel HS-DPCCH. On the other hand, when the dedicated physical data channel DPDCH is used, weights are calculated in step S4 based on the reception power of the dedicated physical control channel DPCCH. Then, in step S5, the weights corresponding to the terminal ID obtained in step S1 is updated.

Figure 17B:
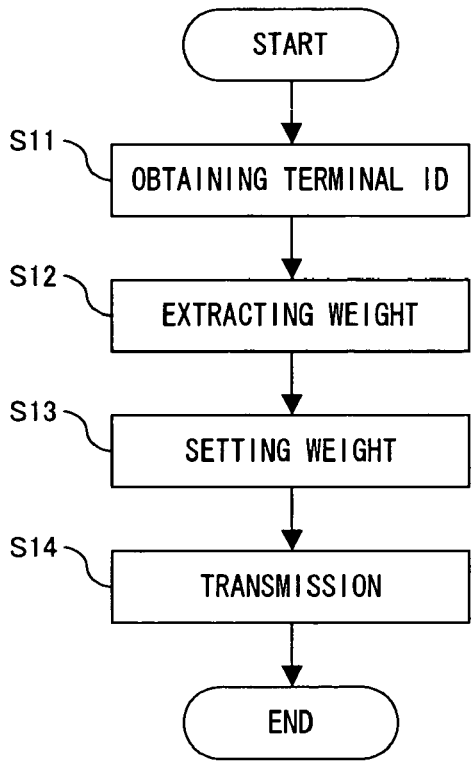
FIG. 17B is a flowchart of transmitting data to a user equipment.

FIG. 17B is a flowchart of transmitting data to the user equipment. The process of this flowchart is performed in synchronization with, for example, time slots of the high speed physical downlink shared channel HS-PDSCH.

In step S11, a terminal ID of the user equipment that is the destination of data to be transmitted is obtained. In step S12, weights corresponding to the terminal ID are extracted from the adaptive processor memory 4. In step S13, the extracted weights are set in corresponding multipliers. Then, in step S14, a signal is transmitted. When data is transmitted from a radio base station to a user equipment in this way, the latest weights that are updated by the process shown in FIG. 17A is used.

Figure 18:
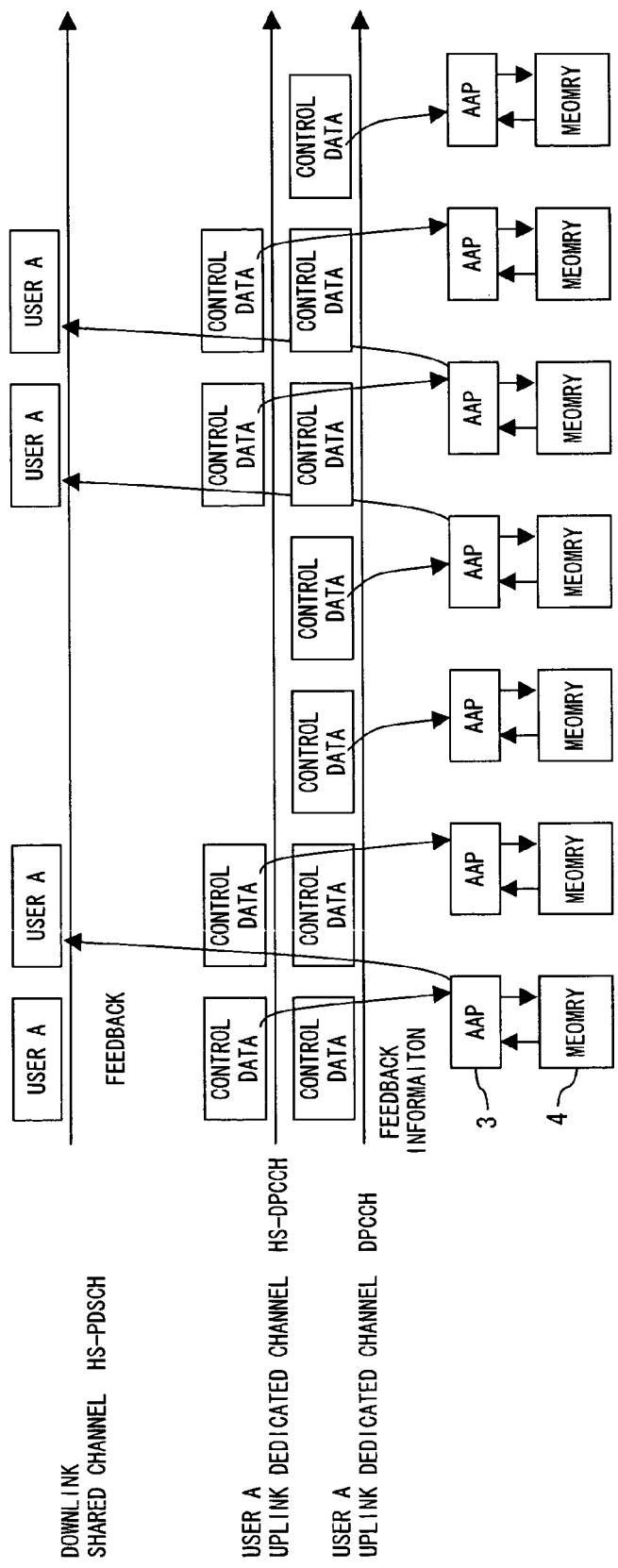
FIG. 18 shows the embodiment in the case where data transmission from the radio base station to the user equipment is temporarily interrupted.

FIG. 18 shows an embodiment in a case where data transmission from a radio base station to a user equipment is temporally stopped. Here, it is assumed that data transmission to the user equipment of a user A via the high speed physical downlink shared channel HS-PDSCH is stopped. In this embodiment, it is assumed that the user equipment of the user A periodically transmits control data to a radio base station via the dedicated physical data channel DPCCH all the time.

In FIG. 18, while data is being transmitted to the user A via the high-speed physical downlink shared channel HS-PDSCH, the radio base station 10 receives control data via the high speed dedicated physical control channel HS-DPCCH. Accordingly, in this case, weights are calculated based on reception power of the high speed dedicated physical control channel HS-DPCCH and a transmission beam is formed using the weights.

Once data transmission to the user A via the high speed physical downlink shared channel HS-PDSCH is stopped, the user equipment of the user A stops the transmission of control data via the high speed dedicated physical control channel HS-DPCCH. That is, the radio base station cannot receive control data via the high speed dedicated physical control channel HS-DPCCH. In this case, the adaptive processor 3 calculates weights based on the reception power of the dedicated physical control channel DPCCH. Then, the adaptive processor memory 4 is updated each time the weights are calculated.

When data transmission to the user A is restarted, the adaptive processor 3 extracts the corresponding weights from the adaptive processor memory 4. Then, a transmission beam is formed using the extracted weights. When the first data is transmitted immediately after the restart, the weights calculated based on reception power of the dedicated physical data channel DPDCH are used.

FIG. 19 explains the effect of the embodiment shown in FIG. 18. Here, it is assumed that the user equipment 120 moves from a location A to a location C via a location B. Furthermore, it is assumed that while the user equipment 120 moves from the location A to the location B, data is transmitted form the radio base station 10 to the user equipment 120 via the high speed physical downlink shared channel HS-PDSCH, and the data transmission is stopped while the user equipment 120 moves from the location B to the location C.

In this case, while the user equipment 120 moves from the location A to the location B, control data is transmitted from the user equipment 120 to the radio base station 10 via the high speed dedicated physical control channel HS-DPCCH, so that the radio base station 10 can recognize the position of the user equipment 120 all the time. That is, the radio base station 10 can form a transmission beam toward the user equipment 120 all the time.

While the user equipment 120 moves from the location B to the location C, the transmission of control data from the user equipment 120 to the radio base station 10 via the high speed dedicated physical control channel HS-DPCCH is stopped. Therefore, if weights are not updated in the radio base station 10 during this period, the weights calculated when the user equipment 120 used to be at located the location B is retained, at the time the user equipment 120 arrives at the point C. If so, when data transmission from the radio base station 10 to the user equipment 120 is restarted under this condition, the radio base station 10 forms a transmission beam B directing toward the point B, even through the user equipment 120 is actually located at the location C.

In the present invention, however, the radio base station 10 can detect the position of the user equipment 120 based on the reception power of the dedicated physical control channel DPCCH while the data transmission via the high speed physical downlink shared channel HS-PDSCH is stopped. Then, the radio base station 10 periodically calculates weights based on the reception power of the dedicated physical control channel DPCCH and updates the adaptive processor memory 4 while the user equipment 120 moves from the location B to the location C. Therefore, when data transmission from the radio base station 10 to the user equipment 120 is restarted upon arrival of the user equipment 120 at the location C, the radio base station 10 can instantly form a transmission beam C directing toward the point C.

Figure 20:
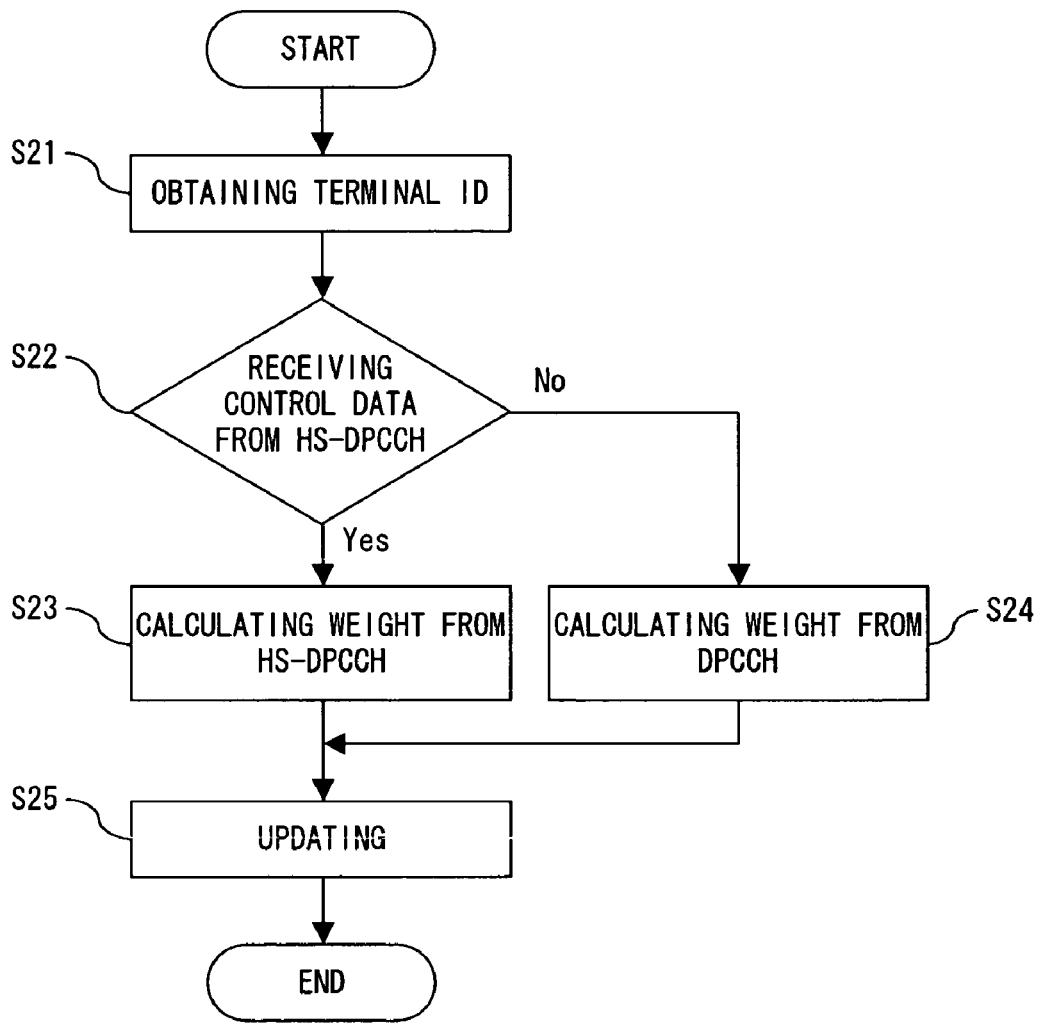
FIG. 20 is a flowchart of calculating and updating a weight in the embodiment shown in FIG. 18.

FIG. 20 is a flowchart of calculating and updating weights in the embodiment shown in FIG. 18. Steps S21 through 25 are basically identical to steps S1 through S5 shown in FIG. 17A. In stead of S2, it is checked in step S22 whether or not control data is received from a user equipment via the high speed dedicated physical control channel HS-DPCCH. Then, when control data is received via the high speed dedicated physical control channel HS-DPCCH, weights are calculated based on the reception power in step S23. If not, weights are calculated based on the reception power of the dedicated physical control channel DPCCH. In a case where control data is received from both the high speed dedicated physical control channel HS-DPCCH and the dedicated physical control channel DPCCH, weights are calculated based on the reception power of the former channel.

Meanwhile, the high-speed physical downlink shared channel HS-PDSCH of the 3GPP system is shared by a plurality of user equipments by a time division multiplexing method as described above. Further, a CDMA method is used in the 3GPP system so that a plurality of users can be code-multiplexed in each time slot of time division multiplexing. FIG. 21A shows a condition in which five users are code-multiplexed in a certain time slot. When a plurality of data sets are simultaneously transmitted to a plurality of users in this way, a transmission beam with directivity corresponding to each user is basically formed.

In a case where a composed transmission beam obtained by composing a plurality of transmission beams to be simultaneously formed is outputted nearly in a uniform manner in all the directions in a sector, the radio base station 10 does not perform a directivity control. It is assumed that weights Wa through Wn are shown in FIG. 21B when transmitting data to users 1 through 5 to be code-multiplexed in a certain time slot. In this case, the sums of weights for corresponding antenna elements generally match to each other. Therefore, it is thought that the composed transmission beams are generally uniform in all the directions in a sector. In this case, the radio base station 10 stops the directivity control.

The base station 10 calculates the weights, for example, according to the following calculating formula.

$$Wi = K \cdot Pi / \Sigma Pi$$

Here, "i" is a variable for identifying each antenna element. In addition, "Pi" indicates the reception power of an uplink signal received via the i-th antenna element. Furthermore, "K" is a transformation coefficient in accordance with the type of a channel for transmitting a signal from a user equipment to a radio base station. For example, in the case where weights are calculated based on the reception power of the high speed dedicated physical control channel HS-DPCCH and in the case where weights are calculated based on the reception power of the dedicated physical control channel DPCCH, different values are used. Meanwhile, in the case where weights for the high speed physical downlink shared channel HS-PDSCH are calculated based on the reception power of the dedicated physical control channel DPCCH and the case where weights for the dedicated physical data channel DPDCH are calculated based on the reception power of the dedicated physical control channel DPCCH, the value of "K" may be made different. Similarly, weights for the high speed physical downlink shared channel HS-PDSCH are calculated based on the reception power of the high speed dedicated physical control channel HS-DPCCH and the case where weights for the dedicated physical data channel DPDCH are calculated based on the reception power of the high speed dedicated physical control channel HS-DPCCH, the value of "K" may be made different.

In the above-mentioned embodiment, the high speed physical downlink shared channel HS-PDSCH of the 3GPP system is selected and explained as a shared channel shared by a plurality of user equipments, but the present invention is not limited to this aspect.

What is claimed is:

1. A radio base station apparatus for transmitting signals to a plurality of user equipments with time division multiplexing using a downlink shared channel shared by the plurality of user equipments and receiving signals from each user equipment via an uplink dedicated channel, comprising:

a plurality of antenna elements for transmitting and receiving radio signals;

a detection unit for detecting information about an uplink dedicated channel corresponding to each user equipment from signals received via said plurality of antenna elements;

a directivity control unit for calculating directivity information about directivity of transmission beam for each user equipment based on the information detected by said detection unit;

a storage unit for storing directivity information calculated by said directivity control unit;

a transmission unit for extracting from said storage unit directivity information corresponding to a destination user equipment of data to be transmitted for each time division multiplexing time slot and transmitting signals with the directivity according to the extracted directivity information; and a channel selection unit for selecting, based on traffic volume of transmission data to a user equipment, a downlink dedicated channel or the downlink shared channel as a communication channel for transmitting a signal to the user equipment, wherein the directivity is calculated based on the information detected in a high speed dedicated control channel while data is transmitted to the user equipment via the downlink shared channel, the directivity is calculated based on the information detected in a dedicated control channel while data is not transmitted to the user equipment via the downlink shared channel, and when a communication channel for transmitting a signal to a first user equipment is switched from the downlink dedicated channel to the downlink shared channel by said channel selection unit, said directivity control unit determines directivity of transmission beam for transmitting a signal via the downlink shared channel according to lastly detected reception power of an uplink channel corresponding to the downlink dedicated channel before the channel switching, until reception power of an uplink channel corresponding to the downlink shared channel after the channel switching is obtained by said detection unit.

2. The radio base station apparatus according to claim 1, wherein
said detection unit detects reception power of the uplink dedicated channel corresponding to the first user equipment in respect of each of said plurality of antenna elements.

3. The radio base station apparatus according to claim 1, wherein
when a communication channel for transmitting a signal to the first user equipment is changed from the downlink dedicated channel to the downlink shared channel by said channel selection unit, said directivity control unit determines directivity of transmission beam of first data at a time of transmitting a signal via the downlink shared channel, using information lastly detected by said detection unit during a period of using the downlink dedicated channel.

4. The radio base station apparatus according to claim 1, further comprising
a channel selection unit for selecting, based on traffic volume of transmission data to a user equipment, a downlink dedicated channel or the downlink shared channel as a communication channel for transmitting a signal to the user equipment, wherein
when a communication channel for transmitting a signal to the first user equipment is changed from the downlink shared channel to the downlink dedicated channel by said channel selection unit, said directivity control unit determines directivity of transmission beam at a time of transmitting a signal via the downlink dedicated channel, using information detected by said detection unit during a period of using the downlink shared channel.

5. The radio base station apparatus according to claim 1, wherein
said directivity control unit comprising:
a weight calculation unit for calculating a weight of transmission beam of each of said plurality of antenna elements based on information detected by said detection unit; and
a weight setting unit for setting the weight calculated by said weight calculation unit to each of said plurality of antenna elements when a signal is transmitted to the first user equipment via the downlink shared channel.

6. The radio base station apparatus according to claim 5, wherein
when weights that are obtained regarding said plurality of antenna elements by said weight calculation unit are substantially identical to each other, said weight setting unit does not set the weights to said plurality of antenna elements.

7. The radio base station apparatus according to claim 5, further comprising
a channel selection unit for selecting, based on traffic volume of transmission data to a user equipment, a downlink dedicated channel or the downlink shared channel as a communication channel for transmitting a signal to the user equipment, wherein
when a communication channel for transmitting a signal to the first user equipment is changed from the downlink dedicated channel to the downlink shared channel by said channel selection unit, said weight calculation unit calculates a weight of transmission beam at a time of transmitting a signal via the downlink shared channel, using information detected by said detection unit during a period of using the downlink dedicated channel.

8. The radio base station apparatus according to claim 5, further comprising
a channel selection unit for selecting, based on traffic volume of transmission data to a user equipment, a downlink dedicated channel or the downlink shared channel as a communication channel for transmitting a signal to the user equipment, wherein
when a communication channel for transmitting a signal to the first user equipment is changed from the downlink shared channel to the downlink dedicated channel by said channel selection unit, said weight calculation unit calculates a weight of transmission beam at a time of transmitting a signal via the downlink dedicated channel, using information detected by said detection unit during a period of using the downlink shared channel.

9. The radio base station apparatus according to claim 1, further comprising
a storage unit for storing directivity information about directivity determined by said directivity control unit, wherein
said directivity control unit updates directivity information based on information detected by said detection unit regardless whether or not data is being transmitted to the first user equipment via the downlink shared channel; and
said transmission unit transmits a signal to the first user equipment via the downlink shared channel based on latest directivity information stored in said storage unit.

10. The radio base station apparatus according to claim 1, wherein
said detection unit detects information about a signal received via a first uplink channel corresponding to the downlink shared channel when the downlink shared channel is used, and detects information about a signal received via a second uplink channel corresponding to the downlink dedicated channel when the downlink dedicated channel is used, and when a communication channel for transmitting a signal to a user equipment is changed from the downlink dedicated channel to the downlink shared channel, said directivity control unit determines directivity of transmission beam at a time of transmitting a signal via the downlink shared channel, using information about a signal received via the second uplink channel.

11. The radio base station apparatus according to claim 1, wherein said detection unit detects information about a signal received via a first uplink channel corresponding to the downlink shared channel when the downlink shared channel is used, and detects information about a signal received via a second uplink channel corresponding to the downlink dedicated channel when the downlink dedicated channel is used, and when a communication channel for transmitting a signal to a user equipment is changed from the downlink shared channel to the downlink dedicated channel, said directivity control unit determines directivity of transmission beam at a time of transmitting a signal via the downlink dedicated channel, using information about a signal received via the first uplink channel.

12. The radio base station apparatus according to claim 1, wherein said detection unit detects information about a signal received via a first uplink channel corresponding to the downlink shared channel while data is being transmitted to a user equipment via the downlink shared channel, and detects information about a signal received via a second uplink channel corresponding to the downlink dedicated channel while data is not being transmitted to the user equipment via the downlink shared channel.

13. A radio communication method for transmitting a signal from a radio base station to a plurality of user equipments with time division multiplexing using a downlink shared channel shared by the plurality of user equipments and receiving a signal from each user equipment via an uplink dedicated channel, comprising:

detecting information about an uplink dedicated channel corresponding to each user equipment from signals received via a plurality of antenna elements;

calculating directivity information about directivity of transmission beam for each user equipment based on the detected information;

storing the calculated directivity information in a storage unit;

extracting from the storage unit directivity information corresponding to a destination user equipment of data to be transmitted for each time division multiplexing time slot and transmitting signals with the directivity according to the extracted directivity information; and selecting, based on traffic volume of transmission data to a user equipment, a downlink dedicated channel or the downlink shared channel as a communication channel for transmitting a signal to the user equipment, wherein the directivity is calculated based on the information detected in a high speed dedicated control channel while data is transmitted to the user equipment via the downlink shared channel, the directivity is calculated based on the information detected in a dedicated control channel while data is not transmitted to the user equipment via the downlink shared channel, and when a communication channel for transmitting a signal to a first user equipment is switched from the downlink dedicated channel to the downlink shared channel by said selecting, the directivity of transmission beam for transmitting a signal via the downlink shared channel is determined according to lastly detected reception power of an uplink channel corresponding to the downlink dedicated channel before the channel switching, until reception power of an uplink channel corresponding to the downlink shared channel after the channel switching is obtained from said detecting.

* * * * *